US011064539B2

(12) United States Patent
Su et al.

(10) Patent No.: US 11,064,539 B2
(45) Date of Patent: *Jul. 13, 2021

(54) RANDOM ACCESS MECHANISMS FOR LINK-BUDGET-LIMITED DEVICES

(71) Applicant: Apple Inc., Cupertino, CA (US)

(72) Inventors: Li Su, San Jose, CA (US); Sami M. Almalfouh, San Jose, CA (US); Venkateswara Rao Manepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,321

(22) Filed: Feb. 7, 2020

(65) Prior Publication Data

US 2020/0178313 A1 Jun. 4, 2020

Related U.S. Application Data

(63) Continuation of application No. 16/376,370, filed on Apr. 5, 2019, now Pat. No. 10,582,544, which is a
(Continued)

(51) Int. Cl.
*H04W 72/04* (2009.01)
*H04W 74/08* (2009.01)
(Continued)

(52) U.S. Cl.
CPC ........ *H04W 74/0833* (2013.01); *H04H 20/38* (2013.01); *H04J 11/00* (2013.01);
(Continued)

(58) Field of Classification Search
CPC . H04W 74/0833; H04W 76/27; H04W 36/08; H04W 74/006; H04W 88/02;
(Continued)

(56) References Cited

U.S. PATENT DOCUMENTS 7,170,889 B2   1/2007 Eagling et al.
9,253,692 B1   2/2016 Shah
(Continued)

FOREIGN PATENT DOCUMENTS

CN   101873668 A   10/2010
EP   3 425 990 A1   6/2015
(Continued)

OTHER PUBLICATIONS

Intel Corporation; Coverage enhancement of PRACH for low cost MTC; R1-135104; 3GPP TSG-RAN WG1 Meeting #75; Nov. 11-15, 2013; San Francisco, CA, USA; eight pages.
(Continued)

*Primary Examiner* — Lakeram Jangbahadur
(74) *Attorney, Agent, or Firm* — Kowert, Hood, Munyon, Rankin & Goetzel, P.C.

(57) ABSTRACT

Mechanisms enabling link-budget-limited (LBL) devices to more effectively perform random access may include: (1) broadcasting a Physical Random Access Channel (PRACH) configuration index (PCI) reserved for LBL devices; (2) configuring LBL devices to use a PCI that is offset from the conventional PCI of current cell; (3) configuring LBL devices to transmit PRACH messages using an alternative set of subframes, different from conventionally-defined subframe set; (4) configuring LBL devices to transmit PRACH messages on odd frames when the conventional PRACH configuration specifies even frames; (5) configuring LBL devices to generate and use extra PRACH preambles that are not used by non-LBL devices; (6) configuring LBL devices to use group B preambles while non-LBL devices are configured to use group A preambles; and (7) boosting power of a random access response message after an $N^{th}$ random access failure with preamble conforming to an LBL-reserved pattern of preambles.

20 Claims, 13 Drawing Sheets

Related U.S. Application Data continuation of application No. 15/201,808, filed on Jul. 5, 2016, now Pat. No. 10,278,209.

(60) Provisional application No. 62/197,698, filed on Jul. 28, 2015, provisional application No. 62/193,657, filed on Jul. 17, 2015.

(51) Int. Cl.
| | | |
|---|---|---|
| *H04W 76/27* | (2018.01) | |
| *H04H 20/38* | (2008.01) | |
| *H04J 11/00* | (2006.01) | |
| *H04L 12/26* | (2006.01) | |
| *H04W 36/08* | (2009.01) | |
| *H04W 74/00* | (2009.01) | |
| *H04W 88/02* | (2009.01) | |
| *H04W 88/08* | (2009.01) | |

(52) U.S. Cl.
CPC ............ *H04L 43/16* (2013.01); *H04W 36/08* (2013.01); *H04W 76/27* (2018.02); *H04W 74/006* (2013.01); *H04W 88/02* (2013.01); *H04W 88/08* (2013.01)

(58) Field of Classification Search
CPC ............ H04W 88/08; H04W 74/0866; H04W 72/044; H04W 72/042; H04H 20/38; H04J 11/00; H04L 43/16
See application file for complete search history.

(56) References Cited

U.S. PATENT DOCUMENTS

| | | | |
|---|---|---|---|
| 2014/0010214 A1* | 1/2014 | Hooli | H04W 72/0446 370/336 |
| 2014/0098761 A1* | 4/2014 | Lee | H04B 17/318 370/329 |
| 2014/0112254 A1* | 4/2014 | Lindoff | H04W 74/002 370/328 |
| 2015/0156760 A1* | 6/2015 | Yu | H04W 72/0453 370/330 |
| 2016/0021681 A1* | 1/2016 | Nan | H04W 74/008 370/329 |
| 2016/0150570 A1 | 5/2016 | Wang et al. | |
| 2016/0227580 A1* | 8/2016 | Xiong | H04W 4/90 |
| 2016/0295609 A1* | 10/2016 | Vajapeyam | H04W 74/0833 |

FOREIGN PATENT DOCUMENTS

| | | |
|---|---|---|
| WO | WO 2012/130270 A1 | 10/2012 |
| WO | WO 2012/173565 A1 | 12/2012 |

OTHER PUBLICATIONS

Office Action, Chinese Application for Invention No. 201610556764.8, dated Mar. 18, 2019, 21 pages.

* cited by examiner

FIG. 8

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

900 receive an index $I_{LBL}$ that has been broadcast by a base station, wherein the index $I_{LBL}$ identifies a first configuration for transmission of a Physical Random Access Channel (PRACH) by link-budget-limited UE devices in a cell corresponding to the base station, wherein the index $I_{LBL}$ is different from an index $I_{NLBL}$ that is also broadcast by the base station, wherein the index $I_{NLBL}$ identifies a second configuration for transmission of the PRACH by non-link-budget-limited UE devices in the cell    910

in response to a determination that said UE device has been classified as being link budget limited, transmit the PRACH to the base station, wherein the PRACH is transmitted according to the first configuration    915

Fig. 9

1000 receive a first index that has been broadcast by a base station, wherein the first index identifies a first configuration for transmission of a Physical Random Access Channel (PRACH) by non-link-budget-limited UE devices in a cell of the base station    1010

add an offset to the first index to obtain a second index, wherein the second index identifies a second configuration for transmission of the PRACH by link-budget-limited UE devices in the celln    1015

in response to a determination that the UE device has been classified as being link budget limited, transmit a PRACH to the base station, wherein the PRACH is transmitted according to the second configuration    1020

Fig. 10

1100 receive a first index that has been broadcast by a base station, wherein the first index identifies a first configuration for transmission of a Physical Random Access Channel (PRACH), wherein the first configuration has a conventionally-defined set of allowable subframes for transmission of the PRACH by non-link-budget limited UE devices in a cell corresponding to the base station   1110

in response to a determination that the UE device has been classified as being link budget limited, transmit the PRACH to the base station, wherein the PRACH is transmitted in a subframe from an alternative set of allowable subframes, wherein the alternative set is disjoint from the conventionally-defined set of allowable subframes  1115

*Fig. 11*

1200 receive a first index that has been broadcast by a base station, wherein the first index identifies a first configuration from a list of configurations for transmission of a Physical Random Access Channel (PRACH), wherein each of the configurations in said list has: (a) a corresponding conventionally-defined set of allowable subframes for transmission of the PRACH by non-link-budget limited UE devices in a cell corresponding to the base station; and (b) a corresponding alternative set of allowable subframes for transmission of the PRACH by link-budget-limited UE devices in the cell, wherein the corresponding alternative set is disjoint from the corresponding conventionally-defined set    1210

in response to a determination that the UE device has been classified as being link budget limited, transmit the PRACH to the base station, wherein the PRACH is transmitted in one of the subframes from the alternative set of allowable subframes corresponding to the first index  1215

```
receive a first index that has been broadcast by a base station, wherein the first
index identifies a first configuration for transmission of a Physical Random
Access Channel (PRACH), wherein the first configuration specifies that
transmission of the PRACH by non-link-budget-limited UE devices is restricted
to even-numbered frames and to a conventionally-defined set of allowable
subframes    1310
```

↓

```
in response to a determination that the UE device has been classified as being
link budget limited, transmit the PRACH to the base station, wherein the
PRACH is transmitted in an odd-numbered frame and in one of the subframes
from the conventionally-defined set  1315
```

```
receive a logical root sequence number that has been broadcast by a base
station    1410
```

↓

```
generate a set of preambles based on data including the logical root sequence
number, where the action of generating the set of preambles includes
determining a first physical root sequence number according to a conventional
mapping of logical root sequence numbers to physical root sequence numbers,
wherein the set of preambles includes: (a) a first subset of preambles for
transmission of a Physical Random Access Channel (PRACH) by non-link-
budget-limited UE devices; and (b) a second subset of preambles for
transmission of the PRACH by link-budget-limited UE devices, wherein the first
subset and the second subset of disjoint subsets  1415
```

↓

```
in response to a determination that the UE device has been classified as being
link budget limited, transmitting the PRACH to the base station using one of the
preambles from the second subset  1420
```

```
receive system information that has been broadcast by a base station, wherein
the system information includes: (1) a logical root sequence number; (2) a total
number of preambles included in a set of preambles, wherein the set of
preambles includes a first group of preambles and a second group of one or
more preambles, wherein the first group and the second group are disjoint; and
(3) a number $n_1$ of preambles in the first group   1510
```

```
generate the set of preambles based on data including the logical root
sequence number, wherein said generating includes generating the first group
of preambles with size equal to the number $n_1$, and generating the second
group of one or more preambles with size equal to a difference between the
total number and the number $n_1$, wherein the first group of preambles is
reserved for Physical Random Access Channel (PRACH) transmissions by
non-link-budget-limited UE devices, wherein the second group of one or more
preambles is used for PRACH transmissions by link-budget-limited UE devices
1515
```

```
in response to a determination that the UE device has been classified as being
link budget limited, transmit the PRACH to the base station using one of the
one or more preambles from the second group 1520
```

> perform one or more iterations of a set of operations until a termination condition is achieved, wherein the set of operations includes: 1610
>
>> generating a preamble for a PRACH message 1615
>>
>> transmitting the PRACH message to a base station, wherein the PRACH message includes the preamble, wherein the one or more preambles in the one or more respective transmissions of the PRACH message are generated based on: (a) a sequence of preamble index offsets, wherein the sequence has been configured for use by link-budget-limited UE devices; and (b) a first index of a first preamble generated for a first of the one or more transmissions of the PRACH message 1620

> in response to a determination that a random access response (RAR) message has not been received after having transmitted a previous PRACH message, performing a set of operations including: 1660
>
>> generating a preamble based at least in part on a current offset in a sequence of preamble index offsets, where the sequence of preamble index offsets has been configured for use by link-budget-limited UE devices 1665
>>
>> transmitting a current PRACH message including the generated preamble 1670

*Fig. 16B*

1700 receive a current PRACH message after having received a plurality of previous PRACH messages, wherein the previous PRACH messages:
(a) have respective preambles agreeing with a sequence of preamble index offsets, wherein the sequence of preamble index offsets has been configured for use by link budget limited user equipment (UE) devices; and
(b) have resulted in random access failure,
wherein memory of the base station stores a count of the previous PRACH messages    1710 in response to receiving the current PRACH message, transmit a random access response (RAR) message, wherein a power of said transmission of the RAR message is less than or equal to a first power level if a current value of the count is less than or equal to a threshold value N, wherein the power of said transmission of the RAR message is greater than the first power level if the current value of the count is greater than the threshold value N   1715

*Fig. 17*

RANDOM ACCESS MECHANISMS FOR LINK-BUDGET-LIMITED DEVICES

PRIORITY CLAIM INFORMATION

This application is a continuation of U.S. patent application Ser. No. 16/376,370, entitled "Random Access Mechanisms for Link-Budget-Limited Devices" and filed on Apr. 5, 2019, which is a continuation of U.S. patent application Ser. No. 15/201,808, entitled "Random Access Mechanisms for Link-Budget-Limited Devices" and filed on Jul. 5, 2016, which claims priority to:

U.S. Provisional Application No. 62/197,698, filed Jul. 28, 2015, titled "Random Access Mechanisms for Link-Budget-Limited Devices", by Li Su, Sami M. Almalfouh, and Venkateswara Rao Manepalli; and U.S. Provisional Application No. 62/193,657, filed on Jul. 17, 2015, titled "Paging Link Budget Limited User Devices", by Li Su, Sami M. Almalfouh, Srinivas Burugupalli, Srinivasan Nimmala, Venkateswara Rao Manepalli, and Vijay Kumar Ramamurthi.

All of above identified Applications are incorporated by reference in their entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, and more particularly, to mechanisms capable of enhancing random access procedure for user equipment devices that are link budget limited.

DESCRIPTION OF THE RELATED ART

Wireless user equipment (UE) devices such as smart phones and tablet computers communicate with wireless networks to perform any of a wide variety of functions such as telephone calls, Internet browsing, email, text messaging, social media updates, navigation using the global positioning system (GPS), etc.

In LTE, the random access procedure (referred to herein as "RACH") is a procedure for synchronizing the user equipment (UE) device with the network (NW). RACH may be used for: initial access by the UE device to the NW; handover of the UE device from one cell to another; RRC re-establishment; uplink and/or downlink data arrival; positioning in RRC connected. RACH is a procedure to allow the UE to access the NW, to synchronize with uplink signals from different UE devices, and to obtain orthogonal resources. Thus, it is important to ensure that the messages of the RACH are successfully communicated.

Some wireless devices may however be link budget limited (LBL), and thus, experience difficulties in receiving messages transmitted by base stations of the network. The base stations may likewise experience difficulties in receiving messages transmitted by the link-budget-limited devices. A device may be link budget limited for any of various reasons, e.g., if the antenna system of the device is performing poorly; or
the antenna system of the device is designed to fit within a housing too small for optimum transmission and/or reception performance in the bands of interest;
the device is located far from the base station; or
obstructions intervene between the base station and the device (e.g., if the device is located inside a building); or
battery power of the device is limited.

A link-budget-limited UE device may have the limited RF range in downlink (receive) direction and/or in the uplink (transmit) direction. Thus, there exists a need for mechanisms capable of enhancing the ability of link-budget-limited devices and base stations to efficiently exchange messages. In particular, there exists a need for mechanisms capable of improving the performance of the random access procedure for link-budget-limited UE devices. It would be desirable if such mechanisms could be compatible with (and/or easily extendible from) the existing LTE network, e.g., minimum or no impact on LTE network capacity, and/or, minimum or no impact on LTE physical layers, to facilitate ease of implementation.

SUMMARY

In one set of embodiments, the base station may be configured to broadcast an alternative PRACH configuration index for use by link-budget-limited devices, where the alternative PRACH configuration index is different from a conventional PRACH configuration index of the cell. The link-budget-limited devices may be configured to transmit PRACH messages using the PRACH configuration identified by the alternative index while non-LBL devices (and/or legacy devices) use the PRACH configuration identified by the conventional index. (The alternative PRACH configuration index may be selected so that the corresponding PRACH configuration has an allowable set of temporal opportunities for PRACH transmission that is disjoint from the allowable set of the conventional PRACH configuration.) The base station receives PRACH messages from the LBL devices based on the alternative PRACH configuration, and receives PRACH messages from the non-LBL devices (and/or legacy devices) based on the conventional PRACH configuration. Thus, when the base station receives a given PRACH message, the base station may easily determine whether or not the PRACH message was transmitted by an LBL device. The alternative index may be signaled by the base station in a new system information block, e.g., a new system information block created for the purpose of signaling RACH parameter(s) to LBL devices.

In one set of embodiments, LBL devices may apply an offset to the conventional PRACH configuration index of the cell, to obtain an LBL-specific index. The LBL devices may transmit PRACH messages using the PRACH configuration identified by the LBL-specific index while non-LBL devices (and/or legacy devices) use the PRACH configuration identified by the conventional index. (The offset may be determined so that the PRACH configuration corresponding to the LBL-specific index has an allowable set of temporal opportunities for PRACH transmission that is disjoint from the allowable set of the conventional PRACH configuration.)

In one set of embodiments, LBL devices may transmit PRACH messages using a modified PRACH configuration that has (a) the same PRACH format and allowable set of frames (SFNs) as the conventional PRACH configuration of the cell, and (b) an allowable set of subframes that is disjoint from the allowable subframe set of the conventional PRACH configuration. (In the context of LTE, the conventional PRACH configuration of the cell is identified by the PRACH configuration index signaled in the system information block of type2.) Non-LBL devices (and/or legacy devices) may use the conventional PRACH configuration to transmit their PRACH messages.

In one set of embodiments, the LBL devices may transmit PRACH messages in odd frames when the conventional PRACH configuration of the cell specifies the use of even frames. Non-LBL devices (and/or legacy devices) may respect the conventional PRACH configuration, including its restriction to even frames, when transmitting PRACH messages. The base station can thus easily determine whether or not a given PRACH message corresponds to an LBL device based on whether the PRACH message occurs in an odd-numbered frame or an even-numbered frame.

In one set of embodiments, an LBL device may be configured to generate an expanded set of preambles, including extra preambles beyond a conventional set of preambles for the cell. The LBL device may select (e.g., randomly select) a preamble from the extra preambles, instead of from the conventional set. The selected preamble may then be used for the transmission of a PRACH message. The base station can thus easily determine whether or not a given PRACH message corresponds to an LBL device based on whether the included preamble is one of the extra preambles or a conventional preamble.

In one set of embodiments, a conventional set of PRACH preambles (e.g., the conventional set defined by an existing wireless communication standard such as LTE) may be partitioned into two groups, i.e., group A and group B. The base station may configure the use of groups A and B so that non-LBL devices (and/or legacy devices) will select preambles from group A and LBL devices will select preambles from group B. Thus, when the base station receives a given PRACH message, the base station may easily determine whether or not the PRACH message was transmitted by an LBL device by determining the group membership (A or B) of the preamble included in the PRACH message.

The base station may employ any of the above-described mechanisms to determine whether a given PRACH message was transmitted by an LBL device. In response to determining that the PRACH message was transmitted by an LBL device, the base station may employ any of various mechanisms to enhance the likelihood of successful completion of the random access procedure. For example, the base station may boost the transmission power of the random access response (msg2) transmitted to the LBL device in response to the received PRACH message, i.e., power boost relative to the power that would be used for a non-LBL device. (In the context of LTE, the random access response may be transmitted with an RA-RNTI consistent with the RA-RNTI of the received PRACH message.) As another example, the base station may employ a more complex decoding algorithm and/or receive beamforming to increase the likelihood of successfully decoding msg3 of the random access procedure. As yet another example, the base station may boost the power of downlink transmissions to the UE device after the random access procedure is completed. As yet another example, the base station may instruct the UE device to employ lower coding rate (more redundancy) and/or lower modulation order for uplink transmissions.

In one set of embodiments, the base station may count the number of failed random access attempts whose preambles are consistent with an LBL-specific pattern of preamble indices or preamble index offsets. When the count exceeds a given threshold, the base station may start boosting the power of msg2 (i.e., the random access response message) on any following random access attempt whose preamble is consistent with the LBL-specific pattern.

The status of a device as being link budget limited may be a permanent condition or a variable condition. For example, some devices may be link budget limited when located far from a serving base station, but become non-link-budget-limited (non-LBL) when located closer to the base station. Some devices may be link budget limited by design, e.g., by virtue of having an antenna system of small size or having limited power to expend due to smaller battery capacity, etc.

If a UE device is link budget limited (LBL) by design, the UE device may perform any of the presently disclosed methods without an explicit step of determining if the UE device is link budget limited (or has been classified as being link budget limited). For example, wherever one of the presently disclosed methods refers to a UE device as performing an action (or set of actions) "in response to a determination that the UE device is link budget limited", a UE device that is LBL by design may perform that action (that set of actions) without a step of determining LBL status. Knowledge of LBL status may be built into the software and/or hardware that controls the UE device.

Note that the techniques described herein may be implemented in and/or used with a number of different types of devices, including but not limited to, base stations, access points, cell phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 8 is a copy of the PRACH configurations listed in Table 5.7.1-2 of 3GPP TS 36.211.

FIG. 9 illustrates a method according to some embodiments, enabling a link-budget-limited UE device to transmit a PRACH message using an alternative PRACH configuration index, different from the conventionally-signaled PRACH configuration index.

FIG. 10 illustrates a method according to some embodiments, enabling a link-budget-limited UE device to transmit a PRACH message using a PRACH configuration index that is offset from the conventionally-signaled PRACH configuration index.

FIGS. 11 and 12 illustrate methods according to some embodiments, enabling a link-budget-limited UE device to transmit a PRACH message using an allowable set of subframes different from that identified by the conventionally-signaled PRACH configuration index.

FIG. 13 illustrates a method according to some embodiments, enabling a link-budget-limited UE device to transmit a PRACH message using an odd frame when the conventional PRACH configuration specifies even frames as the allowable set of PRACH transmission frames.

FIG. 14 illustrates a method according to some embodiments, enabling a link-budget-limited UE device to generate additional preambles beyond a conventionally-defined set of preambles, and to transmit a PRACH message using a selected one of the additional preambles.

FIG. 15 illustrates a method according to some embodiments, enabling a link-budget-limited UE device to perform PRACH transmission using a preamble selected from one subset of a conventionally defined set of preambles while non-LBL device use another subset of the conventionally defined set.

FIG. 16A illustrates a method according to some embodiments, enabling a UE device to signal its status as a link-budget-limited device (to a base station) by using a predetermined sequence of PRACH preamble index offsets for successive PRACH transmissions, until a current PRACH transmission results in success of the random access procedure.

FIG. 16B illustrates a method according to some embodiments, enabling a UE device to signal its status as a link-budget-limited device (to a base station) by using a sequence of PRACH preamble index offsets.

FIG. 17 illustrates a method according to some embodiments, enabling a base station to facilitate successful completion of the random access procedure by link-budget-limited devices in the absence of knowledge of which PRACH-transmitting devices are link-budget-limited and which are not.

Figure 1A:
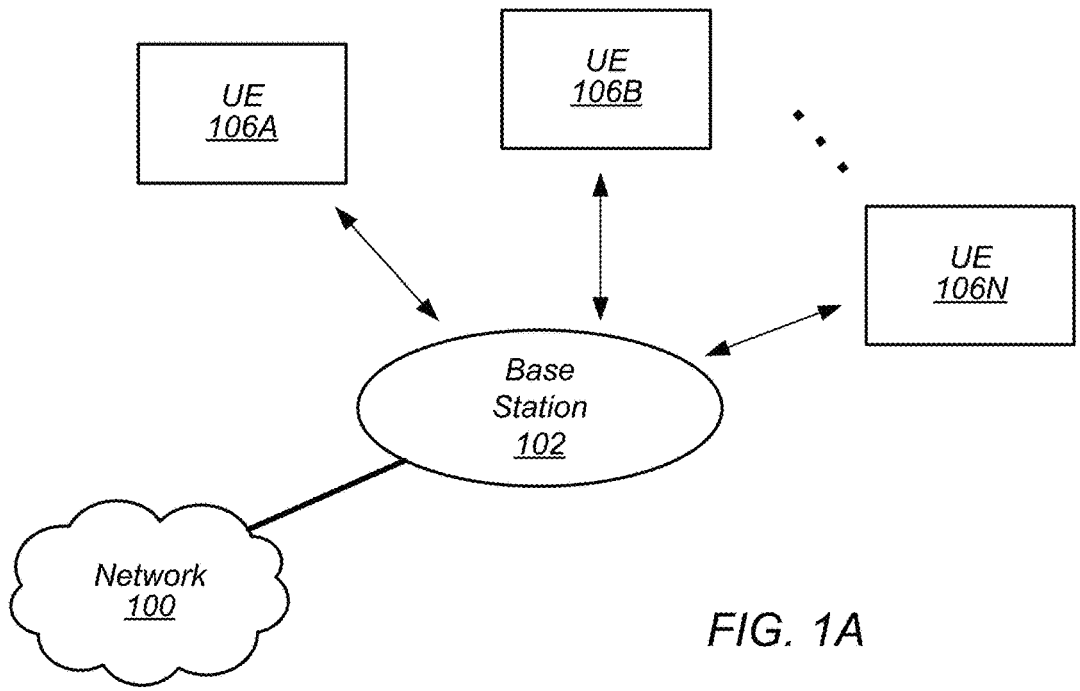
FIG. 1A illustrates an example of a wireless communication system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

BS: Base Station
DL: Downlink
LBL: Link Budget Limited
LTE: Long Term Evolution
MIB: Master Information Block
NW: Network
PDCCH: Physical Downlink Control Channel
PDSCH: Physical Downlink Shared Channel
PRACH: Physical Random Access Channel
PUCCH: Physical Uplink Control Channel
PUSCH: Physical Uplink Shared Channel
RACH: Random Access Procedure or Random Access Channel.
RAR: Random Access Response
RA-RNTI: Random Access—Radio Network Temporary Identifier
RRC: Radio Resource Control
RRC IE: RRC Information Element
RX: Reception
SFN: System Frame Number
SIB: System Information Block
SIBn: System Information Block of Type n
TTI: Transmit Time Interval
TX: Transmission
UE: User Equipment
UL: Uplink
UMTS: Universal Mobile Telecommunication System
ZC sequence: Zadoff-Chu sequence
3GPP: Third Generation Partnership Project Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile phones or smart phones (e.g., iPhone™, Android™-based phones, etc.), portable gaming devices (e.g., Nintendo DS™ Play Station Portable™, Gameboy Advance™, iPhone™), laptops, PDAs, portable Internet devices, music players, data storage devices, other handheld devices, wearable devices (such as smart watches), etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna size. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1A illustrates one embodiment of a wireless communication system. It is noted that FIG. 1A represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices. Some of the wireless devices may be link budget limited (LBL) while others of the devices may be non-LBL.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for UE devices 106A-N as illustrated in FIG. 1A, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Figure 1B:
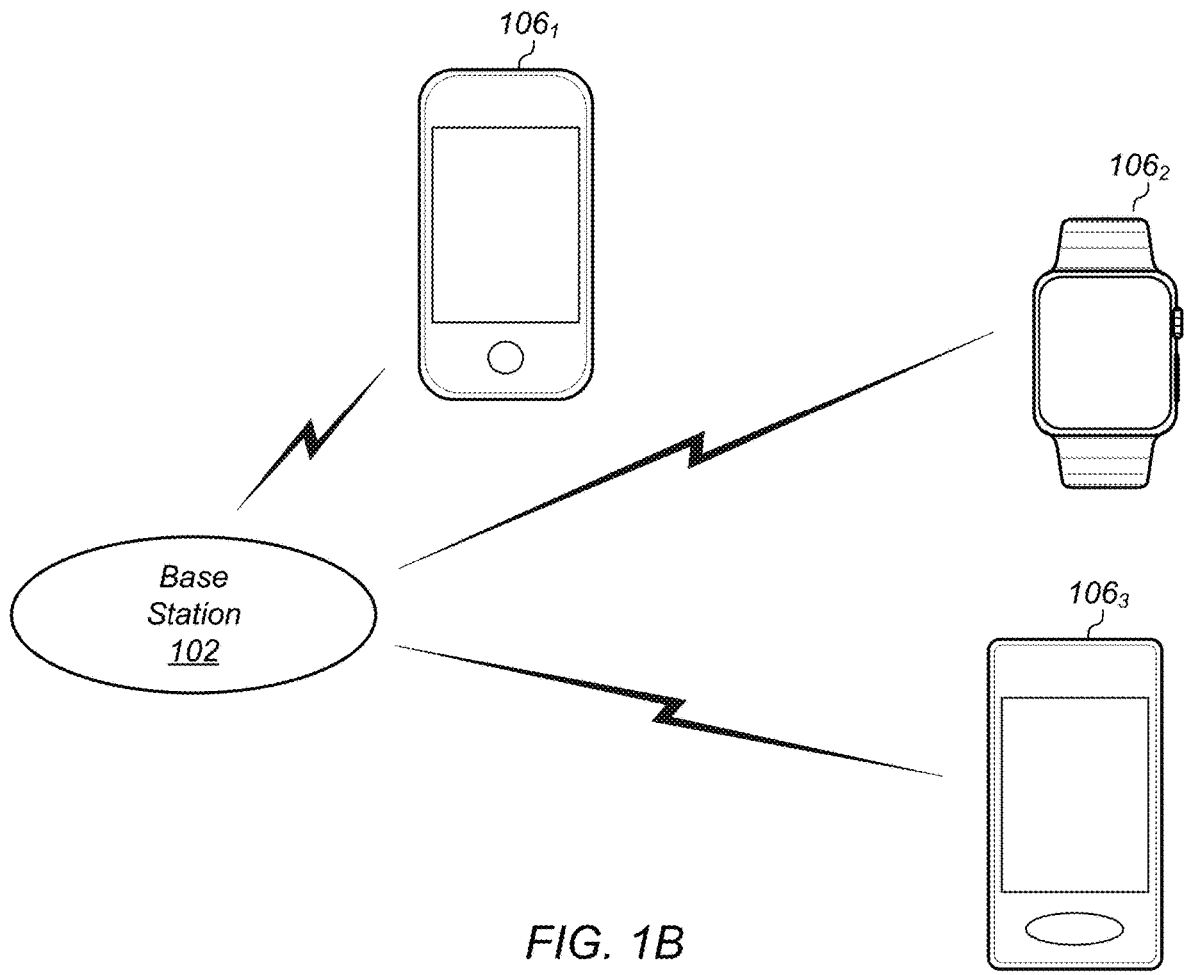
FIG. 1B illustrates an example of the base station 102 in communication with three wireless devices 1061, 1062 and 1063, according to some embodiments.

FIG. 1B illustrates an example of the base station 102 in communication with three wireless devices 1061, 1062 and 1063, according to some embodiments. The wireless devices 1061, 1062 and 1063 may be realized by any combination of the wireless devices described above and/or described below.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
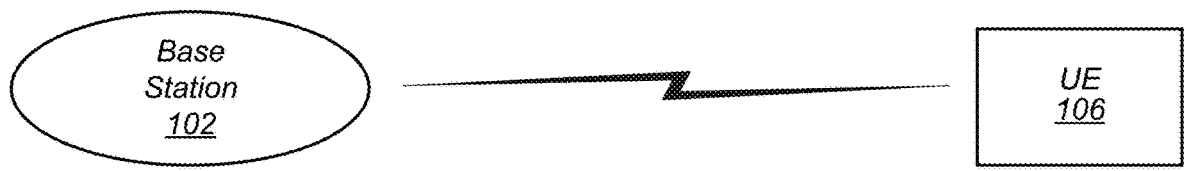
FIG. 2 illustrates a base station 102 in wireless communication with wireless devices 106A and 106B, according to some embodiments.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, a wearable device (such as a smart watch), or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1xRTT (or LTE or GSM), and separate radios for communicating using each of Wi-Fi and Bluetooth. Other configurations are also possible.

Figure 3:
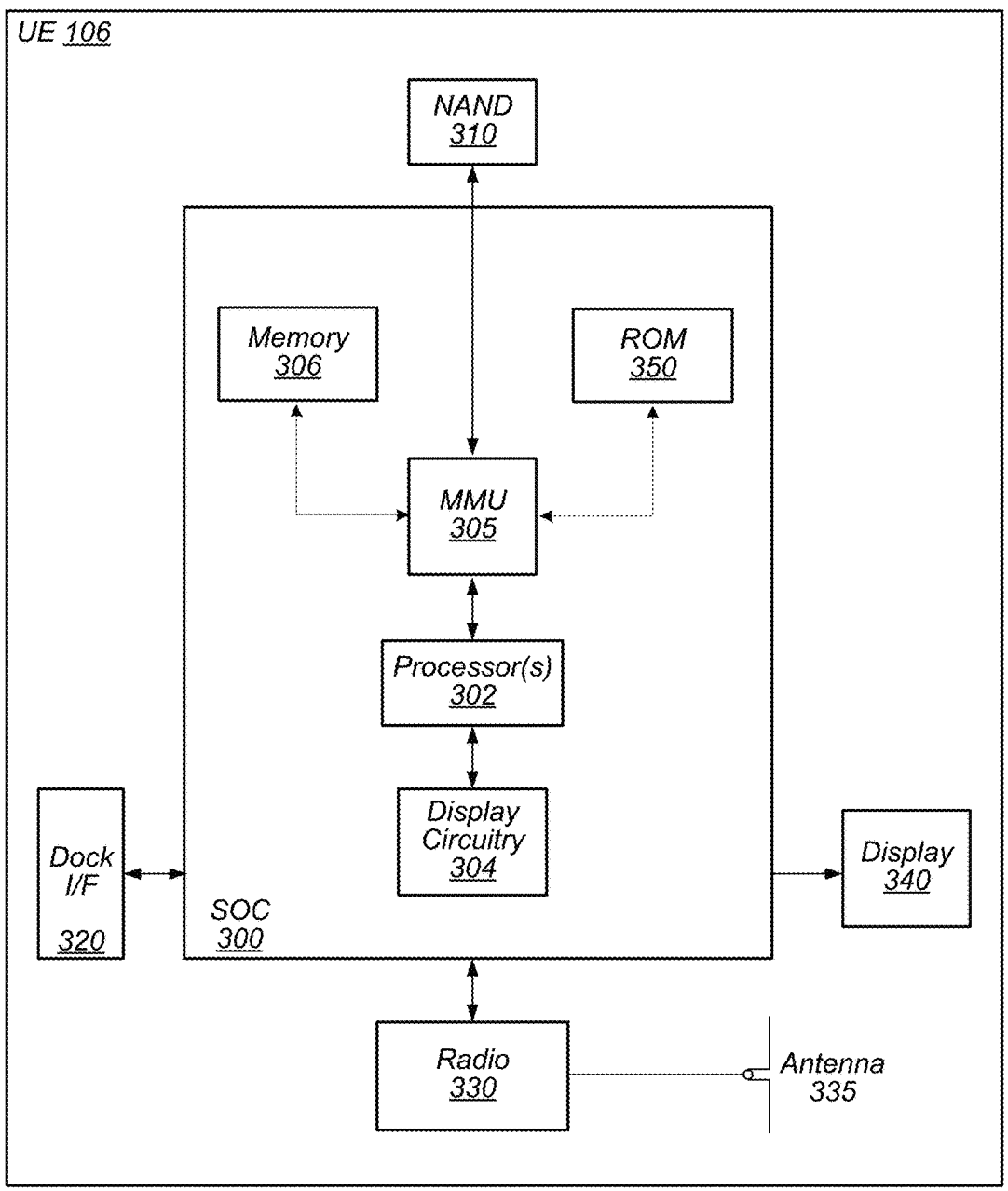
FIG. 3 illustrates an example of a wireless communication system according to some embodiments.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 305, which may be configured to receive addresses from the processor(s) 302 and translate those addresses to locations in memory (e.g., memory 306, read only memory (ROM) 350, NAND flash memory 310). The MMU 305 may be configured to perform memory protection and page table translation or set up. In some embodiments, the MMU 305 may be included as a portion of the processor(s) 302.

The UE 106 may also include other circuits or devices, such as the display circuitry 304, radio 330, connector I/F 320, and/or display 340.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing any of the UE-related method embodiments described herein.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
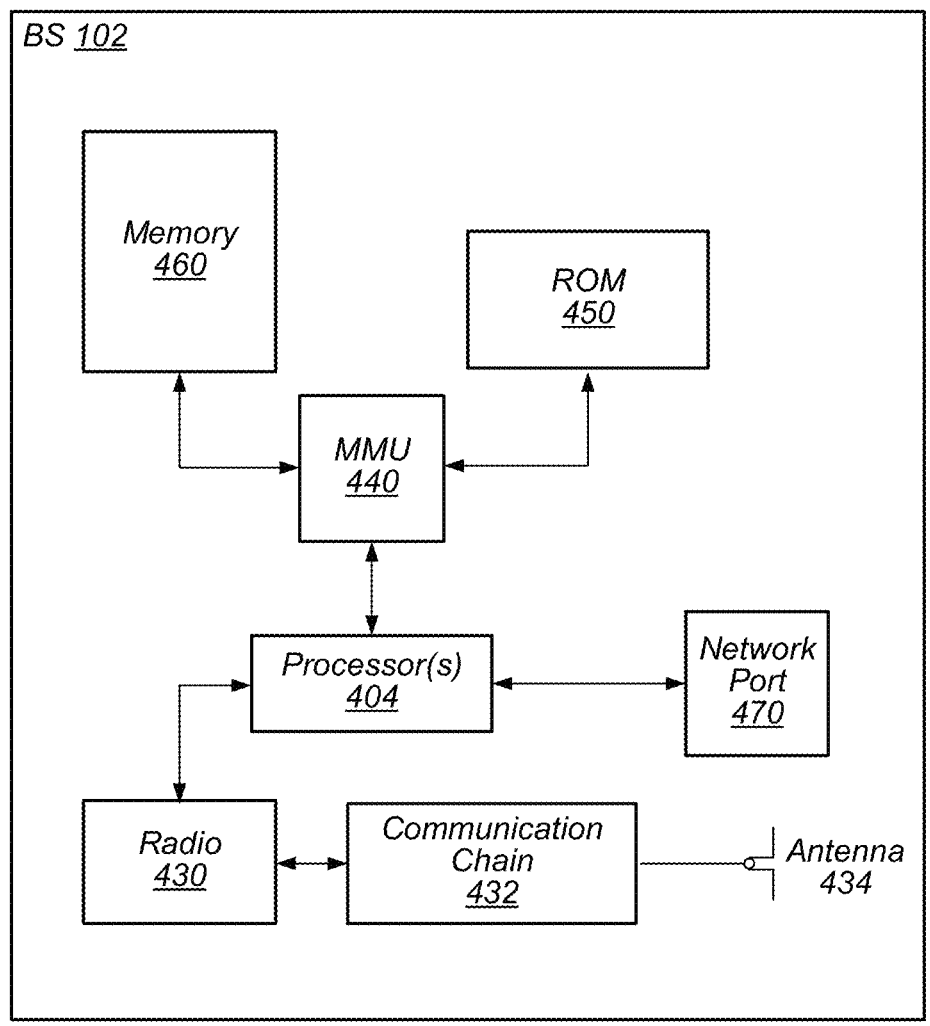
FIG. 4 illustrates an example of a base station according to some embodiments.

FIG. 4—Base Station

FIG. 4 illustrates one embodiment of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

PRACH Specifications in 3GPP

Figure 5A:
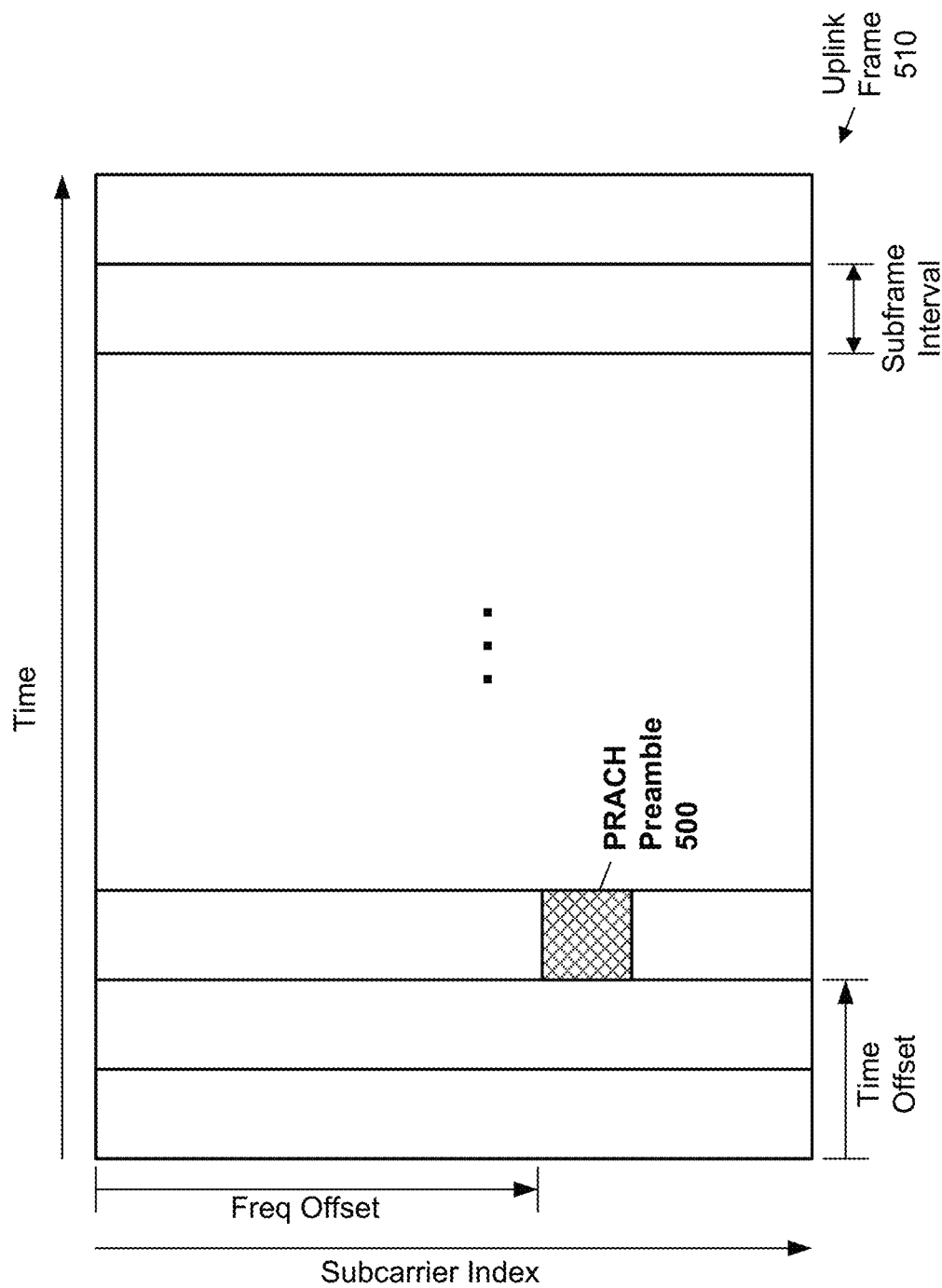
FIG. 5A illustrates a PRACH preamble being transmitted as part of an uplink frame. (PRACH is an acronym for Physical Random Access Channel.)

FIG. 5A illustrates a preamble 500 in a Physical Random Access Channel (PRACH) according to the existing LTE specifications. A UE device transmits the PRACH preamble in an uplink frame 510 in order to initiate the random access procedure. (The uplink frame includes a plurality of subframes.) The time offset and frequency offset of the PRACH preamble within the uplink frame may be determined by the higher layer signaling.

Figure 5B:
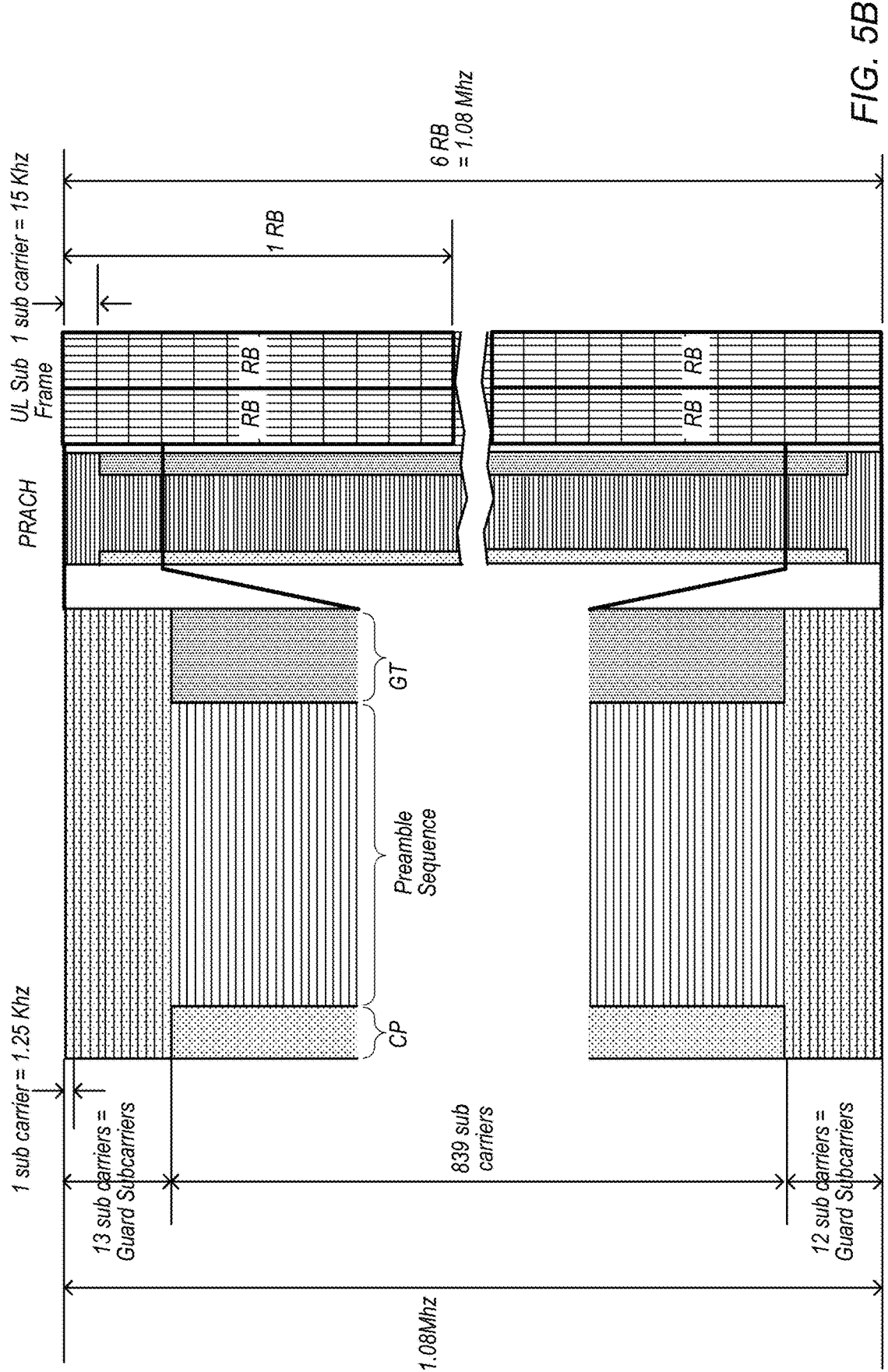
FIG. 5B illustrates the structure of a conventional PRACH, according to one possible format.

FIG. 5B illustrates one particular realization of the PRACH preamble according to existing LTE specifications. In frequency, the PRACH preamble (including the guard subcarriers at the beginning and end) spans 6 RBs=1.08 MHz. In time, the PRACH preamble, including the cyclic prefix (CP) and guard time (GT), spans one uplink subframe.

Formats 0-3 for the PRACH preamble each use a Zadoff-Chu sequence of length 839, whereas format 4 uses a Zadoff-Chu sequence of length 139.

The PRACH preamble occupies 6 resource bocks (RBs) in uplink bandwidth (UL BW).

One PRACH subcarrier occupies 1.25 kHz whereas a normal UL subcarrier occupies 15 kHz. The symbols of the Zadoff-Chu sequence are transmitted on respective ones of the PRACH subcarriers.

Figure 6:
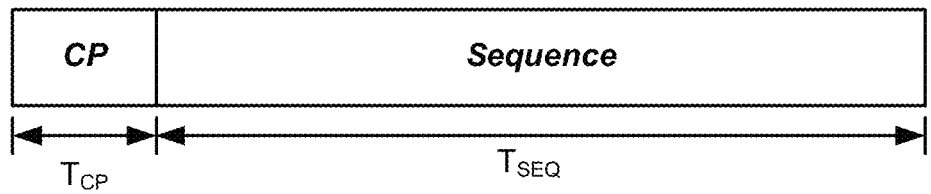
FIG. 6 illustrates a cyclic prefix (CP) and sequence portion of a PRACH.

With respect to the PRACH preamble, FIG. 6 illustrates a cyclic prefix (CP) of duration $T_{CP}$ and a sequence portion of duration $T_{SEQ}$. (The sequence portion contains the Zadoff-Chu sequence.) Table 1 below shows the values of $T_{CP}$ and $T_{SEQ}$ in different formats of the PRACH preamble.

TABLE 1

Random Access Preamble Parameters

| Preamble Format | $T_{CP}$ | $T_{SEQ}$ |
|---|---|---|
| 0 | 3168*Ts | 24576*Ts |
| 1 | 21024*Ts | 24576*Ts |
| 2 | 6240*Ts | 2*24576*Ts |
| 3 | 21024*Ts | 2*24576*Ts |
| 4 | 448*Ts | 4096*Ts |

Summary of RACH Procedure

Figure 7:
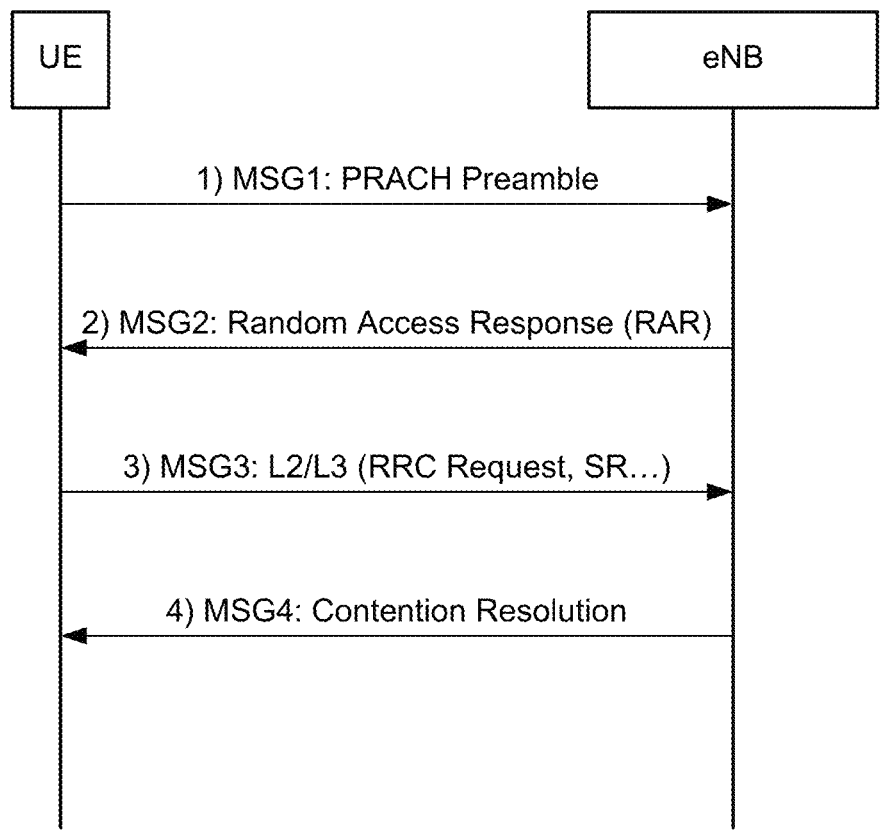
FIG. 7 illustrates messages that may be exchanged between a user equipment (UE) device and base station (e.g., eNodeB) as part of a random access procedure.

The RACH procedure may involve a series of messages sent between the UE and the base station, as shown in FIG. 7.

In a first message (MSG1), the UE transmits the PRACH preamble to the base station (i.e., eNodeB in the parlance of LTE). The PRACH preamble may be configured according to one of the formats discussed above or any other desired format.

In response to decoding the first message, the eNodeB transmits a second message (MSG2). The second message may be referred to as a random access response (RAR). The PDSCH of the RAR message may include an uplink grant. The uplink grant may identified uplink resources in the PUSCH for the UE to transmit uplink data.

In response to decoding the second message, the UE may transmit a third message (MSG3). In the PUSCH of MSG3, the UE may transmit uplink data. The content of the third message may be different in different contexts, e.g., may depend on the purpose for which the RACH procedure has been invoked. For example, the third message may include an RRC Request, Scheduling Request (SR), etc.

In response to receiving the third message, the eNodeB may transmit a fourth message (MSG4), e.g., a contention resolution message.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The transport channels offer information transfer to Medium Access Control (MAC) and higher layers.

Logical channels: Provide services for the Medium Access Control (MAC) layer within the LTE protocol structure.

LTE defines a number of physical downlink channels to carry information received from the MAC and higher layers. The LTE downlink comprises a Physical Downlink Shared Channel (PDSCH) and a Physical Downlink Control Channel (PDCCH). The PDSCH is the main data-bearing channel which is allocated to users on a dynamic and opportunistic basis. The PDCCH carries control information that indicates how resources in the PDSCH are allowed to user devices.

LTE Random Access Configuration

In the random access procedure of LTE, there are many possible PRACH configurations. For each of the cells, the corresponding eNodeB will signal one of the PRACH configurations (by broadcasting the index of the PRACH configuration in SIB2) to be used by devices attempting random access in that cell. This PRACH configuration will identify the preamble format and allowable time resources for devices in the cell to use when transmitting the PRACH. The allowable time resources may include allowable System Frame Numbers (SFNs) and allowable Subframe Numbers (SFNs). FIG. 8 shows the PRACH configurations defined in Table 5.7.1-2 of 3GPP TS 36.211. Each PRACH configuration has a corresponding index that identified its positions with the list of PRACH configurations.

LTE Random Access Preambles

In LTE, the UEs in a given cell may initiate random access by transmitting preambles selected from a set of preambles. (Each UE may randomly select a preamble from the set of preambles.) The UE generates the set of preambles using a root sequence number that is provided by the eNodeB in SIB2. For a given cell, the set of preambles may include up to 64 preambles, and the 64 preambles are divided into two groups: group A and group B.

The eNodeB also broadcasts (in SIB2) the following parameters to configure use of the preamble groups:
  numberOfRA-Preambles is the number of non-dedicated random access preambles available in the cell;
  messageSizeGroupA is the threshold for preamble selection (in bits);
  sizeOfRA-PreamblesGroupA is the size (i.e., number) of random access preambles in group A.

These parameters are included in RACH-ConfigCommon. The number of preambles in group B is equal to the difference
  'numberOfRA-Preambles'–'sizeOfRA-PreamblesGroupA'.

According to the LTE specifications, a UE selects a preamble from group B if the size of a potential UL message to be transmitted by the UE is greater than 'messageSizeGroupA' and the pathloss is less than a pathloss threshold.

The UE may measure pathloss based on RSCP. (RSCP is an acronym for Reference Signal Code Power.) The network may broadcast the cell reference signal power transmitted at the eNodeB in system information blocks (SIBs). The UE measures the received cell reference signal power. The difference between the cell reference signal power and the received value is path loss.

The pathloss threshold may be determined based on the expression:

$$\text{PathLossThreshold} = P_{CMAX} - \text{preambleInitialReceived-}$$
$$\text{TargetPower} - \text{deltaPreambleMsg3} - \text{messagePow-}$$
$$\text{erOffsetGroupB},$$

where
  $P_{CMAX}$ is UE maximum transmit power;
  preambleInitialReceivedTargetPower is the network-expected received power for first $1^{st}$ random access attempt (RACH preamble);
  deltaPreambleMsg3 is the power offset between the power of preamble and Msg3, and
  messagePowerOffsetGroupB is the power offset for preambles in group B.

The following is the definition of the RACH-ConfigCommon information element according to LTE:

```
RACH-ConfigCommon ::=  SEQUENCE {
  preambleInfo           SEQUENCE {
    numberOfRA-Preambles         ENUMERATED {
                  n4, n8, n12, n16, n20, n24, n28,
                  n32, n36, n40, n44, n48, n52, n56,
                  n60, n64},
    preamblesGroupAConfig        SEQUENCE {
      sizeOfRA-PreamblesGroupA         ENUMERATED {
                  n4, n8, n12, n16, n20, n24, n28,
                  n32, n36, n40, n44, n48, n52, n56,
                  n60},
      messageSizeGroupA          ENUMERATED
                  {b56, b144, b208, b256},
      messagePowerOffsetGroupB       ENUMERATED {
                  minusinfinity, dB0, dB5, dB8, dB10, dB12,
                  dB15, dB18},
    ...
  }  OPTIONAL
}
```

Random Access—UE Identification at MSG1 (PRACH Message)

In one set of embodiments, the link-budget-limited device may be configured to transmit PRACH messages with a different PRACH configuration than the non-LBL devices. (The non-LBL devices may use the conventionally-signaled PRACH configuration.) Thus, the base station is able to determine whether or not a received PRACH message corresponds to an LBL device based on whether the PRACH message conforms to the different PRACH configuration or the conventionally-signaled PRACH configuration. For a device that is determined to be LBL, the base station may invoke one or more mechanisms to improve the likelihood of successful completion of the random access procedure for the LBL device. For example, the base station may boost the power of transmission of msg2 (i.e., the random access response message) for the LBL device.

In one embodiment, the eNodeB may broadcast an alternative PRACH configuration index for use by link-budget-limited devices, different from the conventional PRACH configuration index of the current cell. (The alternative PRACH configuration index may also be different from the conventional PRACH configuration indices of neighboring cells.) When the LBL devices transmit PRACH messages, they may use the PRACH configuration identified by the alternative PRACH configuration index. (The conventional PRACH configuration index is signaled in SIB2. However, the alternative PRACH configuration index may be included in a special SIB for the LBL UE devices, i.e., a new SIB created to facilitate the broadcast of RACH configuration information for the LBL devices.) In contrast, when the non-LBL devices transmit PRACH messages, they use the PRACH configuration corresponding to the conventional PRACH configuration index.

In another embodiment, the LBL devices may be configured to employ an alternative PRACH configuration index which is displaced from the conventional PRACH configuration index of the current cell by a predetermined offset. The LBL devices in the cell may transmit PRACH messages according to the PRACH configuration identified by the alternative PRACH index while the non-LBL devices in the cell transmit PRACH messages according to the PRACH configuration identified by the conventional PRACH configuration index. Each LBL device may receive the conventional PRACH configuration index from the base station (e.g., from SIB2), and compute the alternative index by adding the predetermined offset. The base station may determine whether or not a given PRACH message corresponds to an LBL device by determining whether the PRACH format, the SFN and the Subframe Number of the PRACH message are consistent with the alternative PRACH configuration or the conventional PRACH configuration.

In yet another embodiment, the LBL devices may use the preamble format and the SFNs defined by the conventionally signaled PRACH configuration, but use a set of allowable subframes that is different from the allowable subframe set defined by the conventionally signaled PRACH configuration. Thus, the LBL devices transmit PRACH messages in the same frames as non-LBL devices, but in different subframes. For example, according to PRACH configuration 6, only subframes 1 and 6 are conventionally allowed for PRACH transmission. (See the Table in FIG. 8.) In this case, the eNodeB may allow the LBL devices to use subframes 0, 2-5, 7-9 (or any subset of those subframes) for transmission of PRACH messages. The one or subframes available for use by the LBL devices may be broadcast in a special SIB.

In yet another embodiment, if the conventionally-signaled PRACH configuration of a given cell specifies the use of the even SFNs (e.g., configurations corresponding to indices 0-2 and 15-18) for PRACH message transmission, the LBL devices may instead use the odd SFNs, but respect the preamble format and allowed subframes defined by the conventionally-signaled PRACH configuration. As an example, when the conventionally-signaled PRACH configuration index is 2, the LBL devices transmit their PRACH messages in odd frames, in subframe 7, and with preamble format 0.

In one set of embodiments, the set of available preambles in a cell may be expanded to include additional preambles beyond the conventional set of preambles. The additional preambles may be used by the LBL devices to transmit PRACH messages while the preambles of the conventional set are used by non-LBL devices. For example, in one embodiment, an LBL device may generate an expanded set of 128 preambles using the root sequence number provided by the eNodeB. The expanded set of 128 preambles may include the 64 preambles of the conventional set and 64 additional preambles. The LBL device may select (e.g., randomly select) a preamble from the 64 additional preambles. Because the LBL devices and non-LBL devices use disjoint sets of preambles to transmit their PRACH messages, the base station can easily determine whether or not a given PRACH message corresponds to an LBL device by determining the set membership (conventional set or LBL-specific set) of the preamble contained in the PRACH message. While the above discussion given an example where the number of additional preambles is 64, it should be understood that this number could take any of a wide variety of values, e.g., depending on the expected or average number of LBL devices in the cell. In some embodiments, the number of additional preambles is dynamically configurable, e.g., based on system information that is broadcast by the base station.

In one set of embodiments, at least a subset of the preambles of group B may be reserved for PRACH transmissions (or connection-establishment-related PRACH transmissions) by link-budget-limited devices. (See the above discussion of groups A and B.) The eNodeB may configure the cell so that a desired number of preambles are allocated to group B, and may relax the pathloss threshold. (The pathloss threshold may be relaxed by setting the pathloss threshold to a value sufficiently larger to ensure, or increase the likelihood that, LBL UE devices will pass the pathloss test to use group B. Note that LBL UE devices typically have higher values of path loss than non-LBL devices.) Alternatively or in addition, the eNodeB may set 'messageSizeGroupA' such that non-LBL devices will not use the group B preambles (or use the group B preambles infrequently).

In some embodiments, the eNodeB may determine whether a received preamble (i.e., the preamble of a received PRACH message) belongs to group A or group B. If the preamble belongs to group B, the eNodeB may identify the UE device that transmitted the preamble as being an LBL device, and transmit to the UE device a random access response message granting enough uplink resources to the UE device for connection establishment, though the granted uplink resources may be of total size less than the 'messageSizeGroupA'. Also, after detecting that the preamble belongs to group B, the eNodeB may boost the power of messages (MSG2 and following messages) to the LBL device.

In one set of embodiments, a method 900 for operating a user equipment (UE) device may be performed as illustrated in FIG. 9. (Method 900 may also include any subset of the features, elements and embodiments described above in connection with FIGS. 1-8 and described below in connection with FIGS. 10-17.) The method 900 may be performed by a link-budget-limited UE device to facilitate a random access procedure. The method may be implemented by a processing agent of the UE device. The processing agent may be realized by one or more processors executing program instructions, by one or more programmable hardware elements such as FPGAs, by one or more dedicated hardware devices such as ASICs, or by any combination of the foregoing.

While method 900 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 910, the processing agent may receive an index $I_{LBL}$ that has been broadcast by a base station. The index $I_{LBL}$ identifies a first configuration for transmission of a Physical Random Access Channel (PRACH) by link-budget-limited UE devices in a cell corresponding to the base station. The index $I_{LBL}$ is different from an index $I_{NLBL}$ that is also broadcast by the base station, i.e., the index $I_{LBL}$ is not equal to the index $I_{NLBL}$ in terms of numeric value. The index $I_{NLBL}$ identifies a second configuration for transmission of the PRACH by non-link-budget-limited UE devices (and/or legacy devices) in the cell, where the second configuration is different from the first configuration.

At 915, in response to a determination that the UE device has been classified as being link budget limited, the processing agent may transmit the PRACH to the base station, wherein the PRACH is transmitted according to the first configuration. (In contrast, in response to a determination—e.g., at a later time—that the UE device has been classified as not being link budget limited, the UE device may perform PRACH transmission according to the second configuration.)

In some embodiments, the base station may be configured to broadcast a first system information block and a second system information block, wherein the first information block includes the index $I_{LBL}$, and the second system information block includes the index $I_{NLBL}$. The link-budget-limited UE device may read the first SIB to determine the index $I_{LBL}$. More generally, each UE device that is link budget limited may recover the index $I_{LBL}$ from the first SIB. (In contrast, each UE device that is not link budget limited may recover the index $I_{NLBL}$ from the second SIB.)

In some embodiments, the second system information block is a system information block of type 2, e.g., as defined by the LTE standard.

In some embodiments, the first configuration specifies a first set of allowable temporal opportunities (e.g., allowable subframes) for transmission of the PRACH by link-budget-limited UE devices, and the second configuration specifies a second set of allowable temporal opportunities for transmission of the PRACH by non-link-budget-limited UE devices, where the first set and the second set are disjoint sets.

In some embodiments, the index $I_{LBL}$ identifies the first configuration from a list of PRACH configurations defined by an existing wireless communication standard, and the index $I_{NLBL}$ identifies the second configuration from the same list. (For example, the list of configurations may be the list of PRACH configurations specified in 3GPP TS 36.211.) The UE device may store a copy of the list, and access the first configuration from the list based on the index $I_{LBL}$. When the UE device is not link budget limited, e.g., at a later time, the UE device may access the second configuration from the list based on the index $I_{NLBL}$, and perform PRACH transmission using the second configuration instead of using the first configuration.

As noted above, the index $I_{LBL}$ is different from the index $I_{NLBL}$. In some embodiments, the index $I_{LBL}$ is also different from one or more additional PRACH configuration indices that are broadcast respectively by one or more neighboring base stations, where the one or more additional PRACH configuration indices are broadcast for use by non-link-budget-limited UE devices in one or more additional cells corresponding respectively to the one or more additional base stations. In some embodiments, each of a plurality of neighboring base stations may be configured to perform method 900. The base stations may be configured so that each base station selects its index $I_{LBL}$ so as to be different from its index $I_{NLBL}$ and to be different from the index $I_{LBL}$ and the index $I_{NLBL}$ transmitted by the other base stations.

In one set of embodiments, a method for operating a base station may be performed as described below. (The method may also include any subset of the features, elements and embodiments described above in connection with FIGS. 1-9 and described below in connection with FIGS. 10-17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast an index $I_{LBL}$. The index $I_{LBL}$ identifies a first configuration for transmission of a Physical Random Access Channel (PRACH) by link-budget-limited UE devices in a cell corresponding to the base station. The index $I_{LBL}$ is different from an index $I_{NLBL}$ that is also broadcast by the base station, i.e., the index $I_{LBL}$ is not equal to the index $I_{NLBL}$ in terms of numeric value. The index $I_{NLBL}$ identifies a second configuration for transmission of the PRACH by non-link-budget-limited UE devices (and/or legacy devices) in the cell, where the second configuration is different from the first configuration.

The processing agent may receive a PRACH, i.e., a PRACH that has been transmitted by a UE device. The processing agent may determine whether the PRACH has been transmitted according to the first configuration or according to the second configuration. The first configuration and the second configuration may have different preamble formats, and/or, different allowed system frame numbers, and/or different allowed subframe numbers. Any or all such differences may be used as the basis for determining whether the PRACH has been transmitted according to the first configuration or according to the second configuration.

In response to determining that the PRACH has been transmitted according to the first configuration, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) In contrast, if the processing agent determines that the PRACH has been transmitted according to the second configuration, the processing agent may not invoke the one or more communication enhancement mechanisms.

In one set of embodiments, a method 1000 for operating a user equipment (UE) device may be performed as illustrated in FIG. 10. (Method 1000 may also include any subset of the features, elements and embodiments described above in connection with FIGS. 1-9 and described below in connection with FIGS. 11-17.) The method 1000 may be performed by a link-budget-limited UE device to facilitate a random access procedure. The method may be implemented by a processing agent of the UE device. The processing agent may be realized by one or more processors executing program instructions, by one or more programmable hardware elements, by one or more dedicated hardware devices such as ASICs, or by any combination of the foregoing.

While method 1000 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1010, the processing agent may receive a first index that has been broadcast by a base station, wherein the first index identifies a first configuration for transmission of a Physical Random Access Channel (PRACH) by non-link-budget-limited UE devices in a cell of the base station. The first index may be the PRACH configuration index that is conventionally signaled by the eNodeB of LTE. In other words, the first index may be a PRACH configuration index conforming to the LTE wireless communication standard, e.g., as defined in 3GPP TS 36.211.

At 1015, the processing agent may add an offset (i.e., a non-zero offset) to the first index in order to obtain a second index, wherein the second index identifies a second configuration for transmission of the PRACH by link-budget-limited UE devices in the cell. The second configuration is different from the first configuration.

At 1020, in response to a determination that the UE device has been classified as being link budget limited, the processing agent may transmit a PRACH to the base station, wherein the PRACH is transmitted according to the second configuration. (In contrast, in response to a determination—e.g., at a later time—that the UE device has been classified as being not link budget limited, the UE device may perform PRACH transmission according to the first configuration, i.e., the configuration identified by the first index.) In some embodiments, the first configuration specifies a first set of allowable temporal opportunities (e.g., allowable subframes) for transmission of the PRACH, and the second configuration specifies a second set of allowable temporal opportunities for transmission of the PRACH, where the first set and the second set are disjoint sets.

In some embodiments, the base station is configured to broadcast the first index as part of SIB2 (i.e., the system information block of type 2), as defined by specifications in 3GPP TS 36.331.

In some embodiments, the first index identifies the first configuration from a list of PRACH configurations defined by an existing wireless communication standard, and the second index identifies the second configuration from the same list of PRACH configurations. (For example, the list of PRACH configurations may be the list defined by 3GPP TS 36.211.) In some embodiment, the above described addition of the offset is an addition modulo $N_{LIST}$, where $N_{LIST}$ is the number of PRACH configurations in said list.

In some embodiments, the method 1000 also includes: (a) receiving a third index that has been broadcast by a second base station, where the third index identifies a third configuration for transmission of the PRACH by non-link-budget-limited UE devices in a second cell corresponding to the second base station; (b) adding the same offset (i.e., the offset of step 1015) to the third index to obtain a fourth index, wherein the fourth index identifies a fourth configuration for transmission of the PRACH by link-budget-limited UE devices in the second cell; and (c) transmitting the PRACH to the second base station, wherein this PRACH is transmitted according to the fourth configuration.

In some embodiments, the offset may be used by a plurality of base stations including said base station.

In some embodiments, each of a plurality of neighboring base stations may perform method 1000. Different ones of the base stations may transmit respectively different values of the first index, but use the same offset to determine their respective values of the second index.

In one set of embodiments, a method for operating a base station may be performed as described below. (The method may also include any subset of the features, elements and embodiments described above in connection with FIGS. 1-10 and described below in connection with FIGS. 11-17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast an index $I_{CONV}$, where the index $I_{CONV}$ identifies a first configuration for transmission of a Physical Random Access Channel (PRACH) by non-link-budget-limited UE devices (and/or legacy devices) in a cell of the base station. The index $I_{CONV}$ may be the PRACH configuration index that is conventionally signaled by LTE base stations. Non-link-budget limited UE devices and/or legacy UE devices in the cell may receive the index $I_{CONV}$, and perform PRACH transmission using the first configuration. In contrast, link-budget-limited UE devices in the cell may perform PRACH transmission using a second configuration that is offset from the first configuration by a known distance in a list of allowed configurations, i.e., a distance that is known to the base station and the link-budget-limited UE devices. See, e.g., FIG. 8.

After having broadcast the index $I_{CONV}$, the processing agent may receive a PRACH, i.e., a PRACH that has been transmitted by a UE device.

The processing agent may analyze the PRACH to determine whether it has been transmitted according to the first configuration or according to the second configuration. The first configuration and the second configuration may have different preamble formats, and/or, different allowed system frame numbers, and/or different allowed subframe numbers. Any or all such differences may be used as the basis for determining whether the PRACH has been transmitted according to the first configuration or according to the second configuration.

In response to determining that the PRACH has been transmitted according to the second configuration, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) In contrast, if the processing agent determines that the PRACH has been transmitted according to the first configuration, the processing agent may not invoke the one or more communication enhancement mechanisms.

In one set of embodiments, a method 1100 for operating a user equipment (UE) device may be performed as illustrated in FIG. 11. (Method 1100 may also include any subset of the features, elements and embodiments described above in connection with FIGS. 1-10 and described below in connection with FIGS. 12-17.) The method 1100 may be performed by a link-budget-limited UE device to facilitate a random access procedure. The method may be implemented by a processing agent of the UE device. The processing agent may be realized by one or more processors executing program instructions, by one or more programmable hardware elements, by one or more dedicated hardware devices such as ASICs, or by any combination of the foregoing.

While method 1100 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1110, the processing agent may receive an index that has been broadcast by a base station, wherein the index identifies a configuration for transmission of a Physical Random Access Channel (PRACH), wherein the configuration has a conventionally-defined set of allowable subframes for transmission of the PRACH. The conventionally-defined set may be used for PRACH transmission by non-link-budget limited UE devices and/or legacy devices in a cell corresponding to the base station. The conventionally-defined set may be the set of allowable subframes defined by a wireless communication standard such as LTE. For example, the conventionally-defined set may be the set of allowable subframes corresponding to a selected one of the PRACH configurations defined in 3GPP TS 36.211. (See Table 5.7.1-2 of that technical specification.) The above described index may be an index to Table 5.7.1-2 of 3GPP TS 36.211.

At 1115, in response to a determination that the UE device has been classified as being link budget limited, the processing agent may transmit the PRACH to the base station. The PRACH may be transmitted in a subframe from an alternative set of allowable subframes, wherein the alternative set is disjoint from the conventionally-defined set of allowable subframes. In some embodiments, the UE device may randomly select a subframe from the alternative set. The alternative set of allowable subframes may be reserved for use by link budget limited UE devices. The link budget limited UE devices may be designed to use the alternative set (as opposed to the conventionally-defined set) when selecting a subframe for PRACH transmission.

In some embodiments, the base station is configured to broadcast system information identifying the alternative set of allowable subframes.

The base station may be configured to monitor the alternative set of allowable subframes for PRACH transmissions from link-budget-limited UE devices, and to monitor the conventionally-defined set of allowable subframes for PRACH transmissions from non-link-budget-limited UE devices and/or legacy UE devices. The ability for the link-budget-limited UE devices to perform PRACH transmissions using allowable subframes disjoint from those used by non-LBL devices and/or legacy devices allows the base station to receive the PRACH transmissions from the link-budget-limited UE device(s) with a lower interference, and thus, to decode those PRACH transmissions with lower error probability.

In some embodiments, the base station is configured to broadcast the index as part of a system information block of type 2, as defined by the LTE standard.

In some embodiments, the method 1100 may also include: in response to a determination that the UE device has been classified as not being link-budget-limited, transmitting another PRACH to the base station, wherein the other PRACH is transmitted in a subframe from the conventionally-defined set of allowable subframes.

In some embodiments, the configuration for transmission of the PRACH also specifies a format for transmission of the PRACH, e.g., one of the PRACH formats defined in 3GPP TS 36.211. The above described PRACH (i.e., the PRACH of step 1115) may be transmitted according to the specified format.

In some embodiments, the configuration for transmission of the PRACH also specifies a constraint on allowable frames, e.g., as shown in FIG. 8. The above described PRACH may be transmitted in a frame conforming to the allowable frames constraint.

In one set of embodiments, a method for operating a base station may be performed as described below. (The method may also include any subset of the features, elements and embodiments described above in connection with FIGS. 1-11 and described below in connection with FIGS. 12-17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast an index, wherein the index identifies a configuration for transmission of a Physical Random Access Channel (PRACH). The configuration may have (be associated with) a conventionally-defined set of allowable subframes for transmission of the PRACH. The conventionally-defined set may be used for PRACH transmission by non-link-budget limited UE devices (and/or legacy devices) in a cell corresponding to the base station. (The conventionally-defined set may be the set of allowable subframes defined by a wireless communication standard such as LTE.) In contrast, link-budget-limited UE devices may be configured to perform PRACH transmissions using an alternative set of allowable subframes, disjoint from the conventionally-defined set.

In addition to having a conventionally-defined set of allowable subframes, the PRACH configuration may identify a preamble format and specify a constraint on allowable frames for PRACH transmission. (See, e.g., FIG. 8.) When performing PRACH transmissions, the link-budget-limited UE devices may use the identified preamble format and use frames conforming to the allowable frames constraint.

After having broadcast the index, the processing agent may receive a PRACH, i.e., a PRACH that has been transmitted by a UE device. The processing agent may determine whether the PRACH has been transmitted in one of the subframes of alternative set or one of the subframes of the conventionally-defined set.

In response to determining that the PRACH has been transmitted in one of the subframes of the alternative set, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) In contrast, if the processing agent determines that the PRACH has been transmitted in one of the subframes of the conventionally-defined set, the processing agent may not invoke the one or more communication enhancement mechanisms.

In one set of embodiments, a method 1200 for operating a user equipment (UE) device may be performed as illustrated in FIG. 12. (Method 1200 may also include any subset of the features, elements and embodiments described above in connection with FIGS. 1-11 and described below in connection with FIGS. 13-17.) The method 1200 may be performed by a link-budget-limited UE device to facilitate a random access procedure. The method may be implemented by a processing agent of the UE device. The processing agent may be realized by one or more processors executing program instructions, by one or more programmable hardware elements, by one or more dedicated hardware devices such as ASICs, or by any combination of the foregoing.

While method 1200 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1210, the processing agent may receive an index that has been broadcast by a base station. The index identifies a first configuration from a list of configurations for transmission of a Physical Random Access Channel (PRACH). Each of the configurations in the list may have:
- a corresponding conventionally-defined set of allowable subframes for transmission of the PRACH by non-link-budget limited UE devices (and/or legacy devices) in a cell corresponding to the base station; and
- a corresponding alternative set of allowable subframes for transmission of the PRACH by link-budget-limited UE devices in the cell, wherein the corresponding alternative set is disjoint from the corresponding conventionally-defined set.

The list of configurations may be stored in a memory of the UE device.

At 1215, in response to a determination that the UE device has been classified as being link budget limited, the processing agent may transmit the PRACH to the base station. The PRACH may be transmitted in one of the subframes from the alternative set of allowable subframes corresponding to the index. If the status of the UE device changes to being not link budget limited, the UE device may transmit a PRACH in one of the subframes of the conventionally-defined set.

In one set of embodiments, a method 1300 for operating a user equipment (UE) device may be performed as illustrated in FIG. 13. (Method 1300 may also include any subset of the features, elements and embodiments described above in connection with FIGS. 1-12 and described below in connection with FIGS. 14-17.) The method 1300 may be performed by a link-budget-limited UE device to facilitate a random access procedure. The method may be implemented by a processing agent of the UE device. The processing agent may be realized by one or more processors executing program instructions, by one or more programmable hardware elements, by one or more dedicated hardware devices such as ASICs, or by any combination of the foregoing.

While method 1300 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1310, the processing agent may receive an index that has been broadcast by a base station. The index may identify a configuration for transmission of a Physical Random Access Channel (PRACH). The configuration may specify that transmission of the PRACH by non-link-budget-limited UE devices (and/or legacy devices) is restricted to even-numbered frames and to a conventionally-defined set of allowable subframes. (Uplink frames are consecutively numbered, e.g., using a system frame number.)

At 1315, in response to a determination that the UE device has been classified as being link budget limited, the processing agent may transmit the PRACH to the base station, wherein the PRACH is transmitted in an odd-numbered frame and in one of the subframes from the conventionally-defined set. By using an odd-numbered frame, the link-budget-limited UE device avoids the even-numbered frames, which are used by the non-link-budget-limited UE devices for PRACH transmissions. This strategy allows the base station to receive the PRACH transmission from the link-budget-limited UE device without interference from PRACH transmissions of non-LBL UE devices (and/or legacy devices), and thus, to decode the PRACH transmission from the link-budget-limited UE device with lower probability of error. The base station may be configured to monitor the even-numbered frames for PRACH transmissions from non-LBL UE devices (and/or legacy device), and to monitor the odd-numbered frames for PRACH transmissions from link-budget-limited UE devices.

In some embodiments, the configuration also specifies a format for PRACH transmission, e.g., one of the formats defined in the LTE standard and referred to in the "Preamble Format" column of Table 5.7.1-2 of 3GPP TS 36.211. (A copy of that Table is given in FIG. 8.) The transmission of the PRACH to the base station, i.e., the transmission of step 1315, may be performed according to said format. The index may be interpreted as the PRACH configuration index of the Table. Each value of the PRACH configuration index may identify a corresponding PRACH configuration including one or more of the following: a corresponding preamble format value, a corresponding constraint on system frame number (e.g., a selection of "even" or "any"), and a corresponding conventionally-defined set of allowable subframes.

In some embodiments, the method 1300 may also include: in response to a determination that the UE device has been classified as not being non-link budget limited, transmitting another PRACH to the base station, wherein the other PRACH is transmitted in an even-numbered frame and in one of the subframes from the conventionally-defined set.

In some embodiments, the base station is configured to broadcast the index as part of SIB2 (i.e., the system information block of type 2), as defined by the LTE standard.

In one set of embodiments, a method for operating a base station may be performed as described below. (The method may also include any subset of the features, elements and embodiments described above in connection with FIGS. 1-12 and described below in connection with FIGS. 13-17.)

The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast an index. The index may identify a configuration for transmission of a Physical Random Access Channel (PRACH). The configuration may specify (or indicate) that transmission of the PRACH by non-link-budget-limited UE devices (and/or legacy devices) is restricted to even-numbered frames and to a conventionally-defined set of allowable subframes.

After having broadcast the index, the processing agent may receive a PRACH, i.e., a PRACH that has been transmitted by a UE device. The processing agent may determine whether the PRACH has been transmitted in an even-numbered frame or an odd-numbered frame. (The processing agent may maintain a system frame number that is incremented from one uplink frame to the next.)

In response to determining that the PRACH has been transmitted in an odd-numbered frame, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) In contrast, if the processing agent determines that the PRACH has been transmitted in an even-numbered frame, the processing agent may not invoke the one or more communication enhancement mechanisms.

Background Regarding the Conventional PRACH Sequence Set

In 3GPP TS 36.211, a list of logical root sequence numbers and corresponding physical root sequence numbers is specified for the Physical Random Access Channel (PRACH). See Table 5.7.2-4 of TS 36.211. The eNodeB signals a logical root sequence number in SIB2. A UE generates a set of 64 Zadoff-Chu sequences based on: parameter Ncs (also signaled in SIB2); and physical root sequence numbers corresponding respectively to consecutive logical root sequence numbers, starting with the signaled logical root sequence number. In particular, the eNodeB generates a first subset of the Zadoff-Chu sequences based on cyclic shifts of a first root sequence (corresponding to the first physical root sequence number) until the first root sequence is exhausted, then generates a second subset of the Zadoff-Chu sequences based on cyclic shifts of a second root sequence (corresponding to the second physical root sequence number) until the second root sequence is exhausted, and so on, until 64 sequences have been generated. According to TS 36.211, the root sequence corresponding to physical root sequence number u is given by:

$$x_u(n) = \exp\left(-j\frac{\pi n(n+1)}{N_{ZC}}\right), 0 \le n \le N_{ZC} - 1,$$

wherein the length $N_{ZC}$ of the root sequence $x_u$ is given by Table 5.7.2.1 of TS 36.211.

Special Preambles Used for Signaling LBL Status of UE Device

In one set of embodiments, a method 1400 for operating a user equipment (UE) device may be performed as illustrated in FIG. 14. (Method 1400 may also include any subset of the features, elements and embodiments described above in connection with FIGS. 1-13 and described below in connection with FIGS. 15-17.) The method 1400 may be performed by a link-budget-limited UE device to facilitate a random access procedure. The method may be implemented by a processing agent. The processing agent may be realized by one or more processors executing program instructions, by one or more programmable hardware elements, by one or more dedicated hardware devices such as ASICs, or by any combination of the foregoing.

While method 1400 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1410, the processing agent may receive a logical root sequence number that has been broadcast by a base station.

At 1415, the processing agent may generate a set of preambles based on data including the logical root sequence number. (The data may also include the parameter Ncs described below.) The action of generating the set of preambles may include determining a first physical root sequence number according to a conventional mapping of logical root sequence numbers to physical root sequence numbers. (In the context of LTE, the conventional mapping may be the mapping defined by Table 5.7.2.1 of 3GPP TS 36.211.) The set of preambles may include:
  a first subset of preambles for transmission of a Physical Random Access Channel (PRACH) by non-link-budget-limited UE devices; and
  a second subset of preambles for transmission of the PRACH by link-budget-limited UE devices, where the first subset and the second subset are disjoint subsets.

In some embodiments, the set of preambles may be generated by applying the sequence generation procedure of 3GPP TS 36.211 Section 5.7.2, but extending that procedure so that more than 64 preambles are generated. For example, the first 64 preambles may form the first subset, and the remaining preambles may form the second sub set.

At 1420, in response to a determination that the UE device has been classified as being link budget limited, the processing agent may transmit the PRACH to the base station using one of the preambles from the second subset.

In some embodiments, the processing agent may generate only the second subset of preambles. For example, if the UE device is link budget limited, it may omit the action of generating the first subset of preambles.

The base station may be configured so that, whenever it receives a PRACH, the base station may determine whether the preamble contained in the received PRACH belongs to the first subset or the second subset, e.g., by performing correlation of the received PRACH against preambles in the first subset and against preambles in the second subset. The subset membership of the correlation-maximizing preamble indicates whether the UE device that transmitted the PRACH is link budget limited or not. Thus, the UE device of method 1400 may signal its link-budget-limited status to the base station by transmitting the PRACH using a preamble selected from the second subset as opposed to a preamble from the first subset. Upon determining that the UE device is link budget limited, the base station may invoke one or more enhancement mechanisms for improving the reliability of uplink and/or downlink communication with the UE device, e.g., mechanisms such as: employing more complex decoding algorithms for decoding uplink transmissions from the UE device; transmitting downlink transmissions to the UE device with increased power; etc. (A non-LBL UE device may transmit the PRACH using a preamble selected from the first subset. Thus, the base station can recognize that the device is not link budget limited.)

In some embodiments, the base station may also be configured to broadcast the logical root sequence number and a parameter Ncs as part of a system information broadcast.

In some embodiments, the first subset of preambles is the set of preambles defined by the existing LTE specifications.

In some embodiments, the method 1400 may also include: in response to a determination that the UE device has been classified as not being link budget limited, transmitting the PRACH to the base station using one of the preambles from the first subset. (The LBL status of the UE device may vary as the UE device moves within a cell, as battery power of the UE device is depleted over time or replenished upon charging, as other objects in the physical environment of the UE device change over time, etc.)

In some embodiments, the UE device may randomly select said preamble from the second subset of preambles.

In some embodiments, the set of preambles may be generated by: (1) generating a sequence of physical root sequence numbers based on the received logical root sequence number; and (2) applying cyclic shifts to root sequences that correspond to the physical root sequence numbers of said sequence. The sequence of physical root sequence numbers may be generated by mapping consecutive logical root sequence numbers, starting with the signaled logical root sequence number, to respective physical root sequence numbers using the conventional mapping.

In one set of embodiments, a method for operating a base station may be performed as described below. (The method may also include any subset of the features, elements and embodiments described above in connection with FIGS. 1-14 and described below in connection with FIGS. 15-17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast a logical root sequence number. Non-link-budget-limited UE devices (and/or legacy devices) may use the logical root sequence number to generate a first subset of preambles for PRACH transmission, e.g., according to a conventionally-defined algorithm. In contrast, UE devices that are link budget limited may generate a second subset of preambles for PRACH transmission, where the second subset is disjoint from the first subset.

After having broadcast the logical root sequence number, the processing agent may receive a PRACH, i.e., a PRACH that has been transmitted by a UE device. The processing agent may determine whether the PRACH has been transmitted using one of the preambles of the first subset or one of the preambles of the second subset.

In response to determining that the PRACH has been transmitted using one of the preambles of the second subset, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) On the other hand, if the processing agent determines that the PRACH has been transmitted using one of the preambles of the first subset, the processing agent may not invoke the one or more communication enhancement mechanisms.

In one set of embodiments, a method 1500 for operating a user equipment (UE) device may be performed as illustrated in FIG. 15. (Method 1500 may also include any subset of the features, elements and embodiments described above in connection with FIGS. 1-14 and described below in connection with FIGS. 16-17.) The method 1500 may be performed by a link-budget-limited UE device to facilitate a random access procedure. The method may be implemented by a processing agent. The processing agent may be realized by one or more processors executing program instructions, by one or more programmable hardware elements, by one or more dedicated hardware devices such as ASICs, or by any combination of the foregoing.

While method 1500 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1510, the processing agent may receive system information that has been broadcast by a base station. The system information may include one or more of the following elements:

a logical root sequence number;

a total number $n_{TOTAL}$ of preambles included in a set of preambles, wherein the set of preambles includes a first group of preambles and a second group of one or more preambles, wherein the first group and the second group are disjoint (as subsets of the set of preambles); and the number $n_1$ of preambles in the first group.

The number $n_2$ is positive but smaller than the number $n_{TOTAL}$:

$$0 < n_1 < n_{TOTAL}.$$

At 1515, the processing agent may generate the set of preambles based on data including the logical root sequence number. The action of generating the set of preambles may include generating the first group of preambles with size equal to the number $n_1$, and generating the second group of one or more preambles with size equal to a difference between the number $n_{TOTAL}$ and the number $n_1$. The first group of preambles may be reserved for Physical Random Access Channel (PRACH) transmissions by non-link-budget-limited UE devices (and/or legacy devices). The second group of one or more preambles may be used for PRACH transmissions by link-budget-limited UE devices.

At 1520, in response to a determination that the UE device has been classified as being link budget limited, the processing agent may transmit the PRACH to the base station using one of the one or more preambles from the second group.

When the base station receives a PRACH, the base station may determine whether the preamble contained in the received PRACH belongs to the first group or the second group, e.g., by correlating the received PRACH against the preambles in the first group and against the one or more preambles in the second group. The group membership (first group or second group) indicates whether the UE device that transmitted the PRACH is link budget limited or not. In response to determining that a given UE device is link budget limited (based on the group membership), the base station may invoke one or more communication enhancement mechanisms to improve the reliability of uplink and/or downlink communications with the UE device.

In some embodiments, the above-described system information may include a RACH-ConfigCommon information element conforming to the LTE standard. The RACH-ConfigCommon message may include the number $n_{TOTAL}$, the number $n_1$ and a message size. The base station may be configured to set the message size equal to a value sufficiently large so as to decrease a number of non-link-budget-limited UE devices that use preambles from the second group (or, so as to decrease the probability that non-link-budget-limited UE devices will use preambles from the second group).

In some embodiments, the system information may include a RACH-ConfigCommon message conforming to the LTE standard. The RACH-ConfigCommon message may include the number $n_{TOTAL}$, the number $n_1$ and a power offset. The base station may be configured to set the power offset to a value sufficiently large so as to increase a number of link-budget-limited UE devices that use preambles from the second group (or, to increase the probability that link-budget-limited UE devices will use preambles from the second group and not preambles from the first group).

In some embodiments, the system information may also include a parameter Ncs, wherein the data of step 1515 includes the parameter Ncs.

In some embodiments, the system information may include a RACH-ConfigCommon message conforming to the LTE standard. The RACH-ConfigCommon message may include the number $n_{TOTAL}$, the number $n_1$, an indication of a power offset, and an indication of a message size threshold. In these embodiments, the method 1500 may also include the following. In response to a determination that the UE device has been classified as not being link budget limited, the processing agent may perform operations including:

determining if (a) a path loss measured by the UE device is less than a path loss threshold determined in part from the power offset and (b) a size of an uplink message to be transmitted by the UE device is greater than the message size threshold;

in response to determining that (a) and (b) are true, selecting a preamble from the first group; and transmitting a PRACH including the selected preamble.

In one set of embodiments, a method for operating a base station may be performed as described below. (The method may also include any subset of the features, elements and embodiments described above in connection with FIGS. 1-15 and described below in connection with FIGS. 16-17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may broadcast system information. The system information may include one or more of the following elements:

a logical root sequence number;

a total number $n_{TOTAL}$ of preambles included in a set of preambles, wherein the set of preambles includes a first group of preambles and a second group of one or more preambles, wherein the first group and the second group are disjoint; and the number $n_1$ of preambles in the first group.

The UE device may generate a set of preambles based on data including the logical root sequence number. The action of generating the set of preambles may include generating the first group of preambles with size equal to the number $n_1$, and generating the second group of one or more preambles with size equal to a difference between the number $n_{TOTAL}$ and the number $n_1$. The first group of preambles may be reserved for Physical Random Access Channel (PRACH) transmissions by non-link-budget-limited UE devices (and/or legacy devices). In contrast, link-budget-limited UE devices may be configured to perform PRACH transmissions using the second group of one or more preambles.

After having broadcast the system information, the processing agent may receive a PRACH, i.e., a PRACH that has been transmitted by a UE device. The processing agent may determine whether the PRACH includes a preamble from the first group or a preamble from the second group.

In response to determining that the PRACH includes a preamble from the second group, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) On the other hand, if the processing agent determines that the PRACH includes a preamble from the first group, the processing agent may not invoke the one or more communication enhancement mechanisms.

Improving Reception of Random Access MSG2 for Link-Budget-Limited Devices

According to the existing LTE specifications, for each random access attempt, the UE may randomly select a preamble from a group of preambles, and transmit the selected preamble in msg1 (i.e., the PRACH message). The PRACH message may be transmitted to the network (NW) via the base station. The UE then waits for msg2, i.e., the so-called random access response message from the base station. Msg2 may be received in the PDCCH and PDSCH of a downlink subframe within a specific time window that is related to the time of transmitting msg1. If msg2 is not received in the time window, the UE backs off a certain amount of time, and randomly selects another preamble from the group, and makes another random access attempt by transmitting another PRACH message (including the newly selected preamble).

Link-budget-limited UE devices have an increased likelihood of missing (e.g., not successfully decoding) msg2 as compared to UE devices that are not link budget limited. If the eNodeB knows that a UE device is link budget limited, the eNodeB can boost the power of msg2 to enable increased likelihood of successful decode of msg2 by the UE device. However, in some situations, the base station may not be able to determine from msg1 whether the UE is link budget limited.

In some embodiments, a link-budget limited (LBL) device may operate as follows.

1) The LBL device may randomly select a preamble from the group of preambles as defined by 3GPP specifications, and transmit the preamble in msg1 of the random access procedure. This transmission may be referred to as the first preamble transmission. If msg2 is received within the expected time window after a transmission of msg1, the LBL device may transmit msg3 of the random access procedure.

2) If the LBL device fails to receive msg2 within the expected time window after a transmission of msg1, another random access attempt may be initiated. In particular, the LBL device may: back off a certain amount of time; and perform another transmission of msg1 (using the same preamble as the first preamble transmission, or alternatively, a next preamble in a sequence of preambles). Backing off means waiting an amount of time before transmitting. The backoff amount may, e.g., be defined relative to the RA (Random Access) window after transmission of MSG1, and may be fixed or random. For example, the backoff amount may be a fixed value for all preamble transmissions after the first transmission, and/or, for all LBL devices in the cell.

Thus, the LBL device may repeatedly transmit msg1 until msg2 is successfully received. The repeated transmissions of msg1 may use the same preamble. Alternatively, the repeated transmissions of msg1 may use a sequence of preambles whose pattern is known to the eNodeB. Successive transmissions of msg1 may use successive preambles from the sequence. (While the first preamble of the sequence may be randomly selected, the relationship between successive preambles of the sequence may be known to the eNodeB.)

In some embodiments, the eNodeB may perform the following operations.

1) The eNodeB may count the number of times that: msg1 has been received with the same preamble, and the corresponding msg2 procedure has failed. In other words, for a given preamble, the eNodeB may count the number of times where the eNodeB:

receives msg1 and the msg1 contains the given preamble; and sends msg2, but no msg3 is received from the UE.

2) If the number of times reaches (or alternatively, exceeds) a threshold value N (e.g., N=2, 3, 4, 5 or 6), then the eNodeB can power boost the transmission of msg2 in response to one or more following instances of msg1 that contain the given preamble, until msg3 is received from the UE device. For example, the PDCCH and/or the PDSCH of msg2 may be power boosted.

The "same preamble" referred to above assumes the case where the LBL-type UE uses the same preamble (as the first preamble transmission) for msg1 retransmissions. Alternatively, if the LBL-type UE uses a preamble sequence for msg1 transmissions, the eNodeB may follow the same preamble sequence. Thus, the eNodeB may count the number of times where the eNodeB:

receives msg1 and the msg1 contains a preamble consistent with the preamble sequence; and sends msg2, but no msg3 is received from the UE.

In some embodiments, an LBL device may be configured to add a special MAC control element (CE) as an additional MAC PDU header in msg3, to indicate to the NW that it is link budget limited. When the base station receives msg3, the base station may determine whether or not the UE that transmitted the msg3 is link budget limited by determining if the special MAC CE is present in the msg3.

In one set of embodiments, an LBL device may transmit a first PRACH message using a first preamble that is randomly selected from an available set of preambles. If the random access attempt corresponding to a previous PRACH message (e.g., the first PRACH message) is not successfully completed, the LBL device may transmit an additional PRACH message. Thus, the LBL device may transmit a succession of PRACH messages until random access is successfully completed. The succession of PRACH messages may have preambles conforming to a sequence of preamble index offsets. (The LBL device may randomly select the sequence of preamble index offsets from a predetermined set of offset sequences. The predetermined set of offset sequences is known to the eNodeB.) Each PRACH message after the first PRACH message may include a respective preamble determined by:

(a) a respective index offset from the selected sequence of index offsets; and (b) the index $I_0$ of the first preamble.

For example, the $k^{th}$ PRACH message after the first PRACH message may include the preamble identified by index $I_0$+offset(k), where offset(k) is the $k^{th}$ offset in the selected sequence of index offsets.

In some embodiments, the random selection from the predetermined set may be based on the cell ID of the eNodeB so that LBL devices in different cells will select different index offset sequences from the predetermined set.

The LBL devices may use index offset sequences selected from the predetermined set of offset sequences. In contrast, when a non-LBL device (and/or a legacy device) experiences failure on any given random access attempt (e.g., by virtue of missing msg2), it may randomly select another preamble from the available set of preambles, and transmit another PRACH message based on the randomly selected preamble. Thus, successive PRACH transmissions from a non-LBL device will generally not be consistent with any of the sequences of the predetermined set. (The probability that a non-LBL device will randomly select a sequence of preambles consistent with any of the sequences of the predetermined set is very low.)

The eNodeB may count the number of failed RACH attempts whose preambles are consistent with a given index offset sequence. As the count grows, the likelihood that the RACH attempts are associated with an LBL device increases. When the eNodeB receives a current PRACH message that is consistent with the given index offset sequence, the eNodeB may determine if the count has reached (or alternatively, is greater than) a threshold value N. If so, the eNodeB may transmit the random access response message (i.e., random access msg2) with increased power relative to the power (or powers) used for the first N transmissions of msg2. In some embodiments, the first N transmissions may be transmitted with a given power $P_0$, and any transmission of msg2 after the first N transmissions may be transmitted with power (or powers) greater than $P_0$.

In one embodiment, successive transmissions of msg2 after the Nth transmission are transmitted with increasingly greater power.

In one set of embodiments, a method 1600 for operating a user equipment (UE) device may be performed as illustrated in FIG. 16A. (Method 1600 may also include any subset of the features, elements and embodiments described above in connection with FIGS. 1-15 and described below in connection with FIG. 17.) The method 1600 may be performed by a link-budget-limited UE device to facilitate a random access procedure. The method may be implemented by a processing agent. The processing agent may be realized by one or more processors executing program instructions, by one or more programmable hardware elements, by one or more dedicated hardware devices such as ASICs, or by any combination of the foregoing.

While method 1600 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1610, the processing agent may perform one or more iterations of a set of operations until a termination condition is achieved. The set of operations may include the operations 1615 through 1620 described below.

At 1615, the processing agent may generate a preamble for a PRACH message.

At 1620, the processing agent may transmit the PRACH message to a base station, wherein the PRACH message includes the preamble. The termination condition may be the condition that the UE device successfully receives a random access response (RAR) message that is responsive to the PRACH message.

The one or more preambles in the one or more respective transmissions of the PRACH message may be generated based on:
 a sequence of preamble index offsets, where the sequence has been configured (or reserved) for use by link-budget-limited UE devices; and
 a first index of a first preamble generated for a first of the one or more transmissions of the PRACH message.

In some embodiments, the method 1600 may also include selecting the sequence of preamble index offsets from a predetermined set of preamble index offset sequences, wherein the predetermined set has been configured (or reserved) for use by link-budget-limited UE devices.

In some embodiments, the action of selecting from the predetermined set is a random selection based on a cell ID of the base station.

In some embodiments, the UE device is link budget limited. A UE device that is link budget limited may require more than one iteration of the set of operations to attain the termination condition.

In some embodiments, for each iteration after a first of the iterations, the set of operations also includes backing off by a fixed amount of time prior to a next one of said transmissions of the PRACH message.

In one set of embodiments, a method for operating a base station may be performed as described below. (The method may also include any subset of the features, elements and embodiments described above in connection with FIGS. 1-16 and described below in connection with FIGS. 16B and 17.) The method may be performed by a base station to facilitate a random access procedure for a link-budget-limited UE device. The method may be implemented by a processing agent of the base station. The processing agent may be realized by one or more processors executing program instructions, by one or more programmable hardware elements such as FPGAs, by one or more dedicated hardware devices such as ASICs, or by any combination of the foregoing. The processing agent may be configured to transmit wireless signals via a transmitter of the base station and receive wireless signals via a receiver of the base station, e.g., as variously described above.

While the method is described below in terms of a number of steps, it should be understood that in various embodiments: one or more of the steps may be omitted; two or more of the steps may be performed at least partially in parallel; one or more steps may be added, as desired; and the steps may be performed in different orders than that described.

The processing agent may receive a current PRACH message, e.g., from a UE device in the cell. A UE device of link-budget-limited type may be configured to repeatedly transmit a PRACH message using preambles conforming to a known pattern, until the random access procedure is successfully completed. In contrast, UE devices of non-LBL type (and/or legacy devices) may be configured to randomly select a preamble for each transmission of a PRACH message.

The processing agent may increment a failure count in response to a determination that the current PRACH message results in random access failure and that the preamble in the current PRACH message and one or more previous PRACH message preambles are consistent with a pattern of preambles reserved for UE devices of LBL type.

In response to determining that the failure count exceeds (or alternatively, reaches) a threshold value, the processing agent may invoke one or more communication enhancement mechanisms for transmission to and/or reception from the UE device that transmitted the PRACH. (For example, the processing agent may boost the power of the random access response message, and/or, boost the power of downlink traffic transmissions to the UE device.) On the other hand, if the processing agent determines that the failure count is less than or equal to (or alternatively, less than) the threshold value, the processing agent may not invoke the one or more communication enhancement mechanisms.

In one set of embodiments, a method 1650 for operating a user equipment (UE) device may be performed as illustrated in FIG. 16B. (Method 1650 may also include any subset of the features, elements and embodiments described above in connection with FIGS. 1-16 and described below in connection with FIG. 17.) The method 1650 may be performed by a link-budget-limited UE device to facilitate a random access procedure. The method may be implemented by a processing agent of the UE device. The processing agent may be realized by one or more processors executing program instructions, by one or more programmable hardware elements, by one or more dedicated hardware devices such as ASICs, or by any combination of the foregoing.

While method 1650 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1660, in response to a determination that a random access response (RAR) message has not been received after having transmitted a previous PRACH message, the processing agent may perform a set of operations including operations 1665 and 1670 described below. (The processing agent may monitor an expected time window for the RAR message, i.e., an expected time window after the previous PRACH transmission.)

At 1665, the processing agent may generate a preamble based at least in part on a current offset in a sequence of preamble index offsets, e.g., as variously described above. The sequence of preamble index offsets may have been configured (or, may be dedicated) for use by link-budget-limited UE devices.

At 1670, the processing agent may transmit a current PRACH message including the generated preamble.

In some embodiments, the above-described preamble may be generated based on the current offset and an initial index, e.g., as variously described above. The initial index may be an index of an initial preamble used in an initial transmission of the PRACH message.

In some embodiments, the method 1650 may also include selecting the sequence of preamble index offsets from a predetermined set of preamble index offset sequences, where the predetermined set has been configured (or reserved) for use by link-budget-limited UE devices.

In some embodiments, the action of selecting from the predetermined set is a random selection based on a cell ID of the base station.

In some embodiments, the sequence of preamble index offsets may be an alternating sequence, i.e., alternating between two distinct offset values.

In some embodiments, the sequence of preamble index offsets may be a cyclic sequence, i.e., cycling through $n_{CYC}$ offset values, wherein $n_{CYC}$ is greater than or equal to two.

In some embodiments, the sequence of preamble index offsets may be a sequence of nonzero values, or a sequence of positive values, or a sequence that includes two or more non zero values as well as one or more zero values.

In some embodiments, the sequence of preamble index offsets may be a sequence of zero values.

In some embodiments, the UE device is link budget limited.

In some embodiments, the set of operations also includes backing off by a fixed amount of time prior to said transmission of the current PRACH message.

In one set of embodiments, a method 1700 for operating a base station device may be performed as illustrated in FIG. 17. (Method 1700 may also include any subset of the features, elements and embodiments described above in connection with FIGS. 1-16B.) The method 1700 may be performed in order to facilitate random access by a link-budget-limited UE device. The method may be implemented by a processing agent of the base station. The processing agent may be realized by one or more processors executing program instructions, by one or more programmable hardware elements, by one or more dedicated hardware devices such as ASICs, or by any combination of the foregoing.

While method 1700 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1710, the processing agent may receive a current PRACH message after having received a plurality of previous PRACH messages. The previous PRACH messages:
  (a) have respective preambles agreeing with a sequence of preamble index offsets, wherein the sequence of preamble index offsets has been configured (or, is dedicated) for use by link-budget-limited user equipment (UE) devices and
  (b) have resulted in random access failure.

A memory of the base station may store a count of the previous PRACH messages.

At 1715, in response to receiving the current PRACH message, the processing agent may transmit a random access response (RAR) message. A power of the transmission of the RAR message may be less than or equal to a first power level if a current value of the count is less than or equal to a threshold value N, where N is an integer greater than one. Alternatively, the power of said transmission of the RAR message may be greater than the first power level if the current value of the count is greater than the threshold value N.

In some embodiments, the method 1700 may also include incrementing the count in response to determining that:
  (1) a preamble of the current PRACH message agrees with an expected preamble based on a preamble index of a first of the previous PRACH messages and a next preamble index offset of the sequence of preamble index offsets; and
  (2) a third random access message, responsive to the RAR message, is not received by the base station.

In some embodiments, the predetermined sequence of preamble index offsets is a sequence of zero values.

In some embodiments, a first of the link-budget-limited UE devices is configured to randomly select the sequence of preamble index offsets from a predetermined set of preamble index offset sequences, and to generate preambles for successive random access attempts using the selected sequence of preamble index offsets.

Embodiments of the present disclosure may be realized in any of various forms. For example some embodiments may be realized as a computer-implemented method, as a computer-readable memory medium, or as a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a base station, the method comprising: at the base station:
   transmitting a first system information block (SIB) including a first index, wherein the first index identifies a first configuration from a list of PRACH configurations, wherein the first configuration specifies a first set of allowable temporal opportunities for transmission of a randomly selected PRACH preamble by link-budget-limited UEs, wherein the first SIB is a SIB for link-budget-limited UEs;
   transmitting a second SIB including a second index, wherein the second index identifies a second configuration from the list of PRACH configurations, wherein the second configuration specifies a second set of allowable temporal opportunities for transmission of a randomly selected PRACH preamble by non-link-budget-limited UEs, wherein the first and second sets of allowable temporal opportunities are respectively specific to the first and second configurations, wherein the second SIB is a SIB type 2 (SIB2);
   at a first time, receiving a first PRACH preamble from a user equipment device (UE), wherein the first PRACH preamble is received according to the first configuration indicating the UE is link budget limited; and
   at a second time, receiving a second PRACH preamble from the UE, wherein the second PRACH preamble is received according to the second configuration indicating the UE is not link budget limited.

2. The method of claim 1, wherein the first PRACH preamble and the second PRACH preamble are selected from distinct sets of preambles.

3. The method of claim 1, wherein the first set of allowable temporal opportunities includes odd frames.

4. The method of claim 1, wherein the second set of allowable temporal opportunities includes even frames.

5. The method of claim 1, further comprising invoking at least one communication enhancement mechanism for communication with a link-budget-limited UE.

6. The method of claim 1, further comprising determining that a number of failed random access attempts for the first UE has reached a threshold.

7. The method of claim 6, further comprising, in response to the determination that the number of failed random access attempts for the first UE has reached the threshold, boosting power of a random access response to the first UE.

8. An apparatus, comprising:
   a processor configured to cause a base station to:
   transmit a first system information block (SIB) including a first index, wherein the first index identifies a first configuration from a list of PRACH configurations, wherein the first configuration specifies a first set of allowable temporal opportunities for transmission of a randomly selected PRACH preamble by link-budget-limited UEs, wherein the first SIB is a SIB for link-budget-limited UEs;
   transmit a second SIB including a second index, wherein the second index identifies a second configuration from the list of PRACH configurations, wherein the second configuration specifies a second set of allowable temporal opportunities for transmission of a randomly selected PRACH preamble by non-link-budget-limited UEs, wherein the first and second sets of allowable temporal opportunities are respectively specific to the first and second configurations, wherein the second SIB is a SIB type 2 (SIB2);
   at a first time, receive a first PRACH preamble from a first user equipment device (UE), wherein the first PRACH preamble is received according to the first configuration indicating the first UE is link budget limited; and
   at a second time, receive a second PRACH preamble from a second UE, wherein the second PRACH preamble is received according to the second configuration indicating the second UE is not link budget limited.

9. The apparatus of claim 8, wherein the first PRACH preamble and the second PRACH preamble are selected from distinct sets of preambles.

10. The apparatus of claim 8, wherein the second set of allowable temporal opportunities includes even frames.

11. The apparatus of claim 8, wherein the first set of allowable temporal opportunities includes odd frames.

12. The apparatus of claim 8, wherein the processor is further configured to cause the base station to invoke at least one communication enhancement mechanism for communication with a link-budget-limited UE.

13. The apparatus of claim 8, wherein the processor is further configured to cause the base station to determine that a number of failed random access attempts for the first UE has reached a threshold.

14. The apparatus of claim 13, wherein the processor is further configured to cause the base station to, in response to the determination that the number of failed random access attempts for the first UE has reached the threshold, boost power of a random access response to the first UE.

15. A base station, comprising:
   a radio; and
   a processor operably connected to the radio and configured to cause the base station to:
   transmit a first system information block (SIB) including a first index, wherein the first index identifies a first configuration from a list of PRACH configurations, wherein the first configuration specifies a first set of allowable temporal opportunities for transmission of a randomly selected PRACH preamble by link-budget-limited UEs, wherein the first SIB is a SIB for link-budget-limited UEs;
   transmit a second SIB including a second index, wherein the second index identifies a second configuration from the list of PRACH configurations, wherein the second configuration specifies a second set of allowable temporal opportunities for transmission of a randomly selected PRACH preamble by non-link-budget-limited UEs, wherein the first and second sets of allowable temporal opportunities are respectively specific to the first and second configurations, wherein the second SIB is a SIB type 2 (SIB2);

at a first time, receive a first PRACH preamble from a first user equipment device (UE), wherein the first PRACH preamble is received according to the first configuration indicating the first UE is link budget limited; and at a second time, receive a second PRACH preamble from a second UE, wherein the second PRACH preamble is received according to the second configuration indicating the second UE is not link budget limited.

16. The base station of claim 15, wherein the first set of allowable temporal opportunities specifies odd frames.

17. The base station of claim 16, wherein the second set of allowable temporal opportunities specifies even frames.

18. The base station of claim 15, wherein the processor is further configured to cause the base station to invoke at least one communication enhancement mechanism for communication with a link-budget-limited UE.

19. The base station of claim 15, wherein the processor is further configured to cause the base station to determine that a number of failed random access attempts for the first UE has reached a threshold.

20. The base station of claim 19, wherein the processor is further configured to cause the base station to, in response to the determination that the number of failed random access attempts for the first UE has reached the threshold, boost power of a random access response to the first UE.

* * * * *